United States Patent [19]

Iwasaki

[11] Patent Number: 5,717,965
[45] Date of Patent: Feb. 10, 1998

[54] PHOTOMETRY DEVICE AND CAMERA WITH PHOTOMETRY DEVICE

[75] Inventor: Hiroyuki Iwasaki, Kawasaki, Japan

[73] Assignee: Nikon Corporation, Tokyo, Japan

[21] Appl. No.: 561,967

[22] Filed: Nov. 22, 1995

[30] Foreign Application Priority Data

Nov. 22, 1994 [JP] Japan .................... 6-287788
Nov. 22, 1994 [JP] Japan .................... 6-287811

[51] Int. Cl.$^6$ .................... G03B 3/00; G03B 7/08
[52] U.S. Cl. .................... 396/233; 396/234; 396/93
[58] Field of Search .................... 348/297–299; 354/430, 432; 396/93, 233, 234

[56] References Cited

U.S. PATENT DOCUMENTS

| | | | |
|---|---|---|---|
| 4,041,308 | 8/1977 | Fujita | 250/226 |
| 5,086,314 | 2/1992 | Aoki et al. | 354/412 |
| 5,373,340 | 12/1994 | Takagi | 354/400 |
| 5,515,132 | 5/1996 | Iwasaki | 354/432 |
| 5,526,088 | 6/1996 | Kusaka | 354/402 |
| 5,526,092 | 6/1996 | Iwasaki | 354/432 |

*Primary Examiner*—Safet Metjahic
*Assistant Examiner*—Eric Nelson

[57] ABSTRACT

A device has a photometry unit for performing a photometry operation of an object field using an accumulation type photometry element, and an accumulation time determination unit for determining the accumulation time of the photometry element. The accumulation time determination unit determines the value of the accumulation time for the next photometry operation by calculating a weighted average of the accumulation times in previous photometry operations. Since the value of the accumulation time for the next photometry operation is determined by calculating a weighted average of the accumulation times in previous photometry operations, the influence of flickering of an illumination light source can be eliminated, and a photometered value can be output within a short period of time.

32 Claims, 22 Drawing Sheets

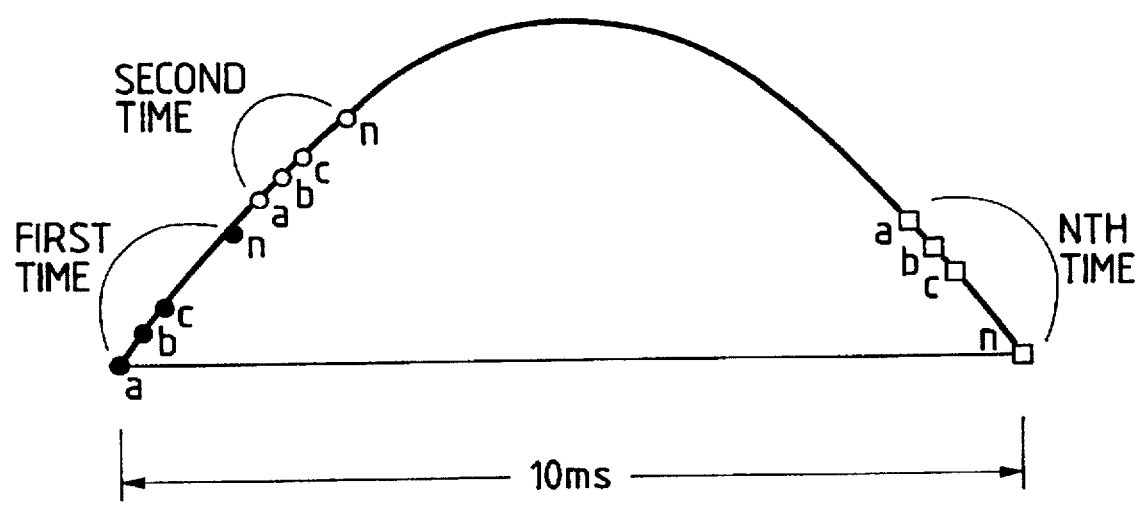

PHOTOMETRY DEVICE AND CAMERA WITH PHOTOMETRY DEVICE

BACKGROUND OF THE INVENTION

1. Field of the Invention

The present invention relates to a photometry device for measuring the luminance of an object and a camera comprising an exposure controller using the photometry device.

2. Related Background Art

Conventionally, when a photometry device of this type performs a plurality of photometry operations, the next accumulation time of a photometry element is calculated based on the previous photometered (or photometric) value and accumulation time while assuming that the brightness of an object field in the next photometry operation is almost equal to that in the previous operation. This photometry device does not pose any problem for a normal object irradiated with sunlight since the photometry cycle is faster than the movement of the object.

However, when illumination is obtained by an AC power supply, a so-called flicker phenomenon occurs; the light repeatedly becomes strong and weak at a cycle (100 Hz in the case of, e.g., a 50-Hz power supply) corresponding to the power supply cycle. Since the flicker cycle is much faster than the movement of the object, and is also faster than the photometry cycle of the normal photometry device, the illumination state in the next photometry state often becomes different from that in the previous photometry operation.

In such a case, it is impossible to predict the next appropriate accumulation time on the basis of the previous photometered value and accumulation time.

In order to solve this problem, a photometry device disclosed in Japanese Patent Application Laid-Open No. 6-95200 performs two photometry operations at a cycle ½ the flicker cycle of the illumination light source, and determines the next accumulation time on the basis of the average value of these photometered values, so that the center of the photometry range is set in the neighborhood of the root-mean-square value of the illumination intensity, thereby realizing stable photometry operations (FIG. 8). Therefore, this photometry device is good in terms of performing photometry operations free from the influence of flickering.

However, the photometry device disclosed in Japanese Patent Application Laid-Open No. 6-95200 described above must perform two photometry operations to calculate one photometered value, resulting in a time-consuming operation.

Also, since the photometry interval between the two photometry operations must be accurately controlled, a control circuit suffers a heavy load.

As another photometry device which can eliminate the influence of flickering, a device described in Japanese Patent Application Laid-Open No. 62-75323 or the like is known. In this photometry device, when photometry calculations are performed by time-serially (in the order of a, b, c, ..., n) A/D-converting the outputs from a plurality of (n) photometry elements, as shown in FIG. 26, the outputs from the photometry elements are time-serially A/D-converted to have the flicker cycle of the illumination AC light source as one calculation cycle, and a photometered output is obtained on the basis of, e.g., the average value in one cycle of these A/D-converted values.

However, there are two different power supply frequencies, i.e., 50 Hz and 60 Hz, that cause a flicker of the illumination AC light source depending on regions. For example, 60 Hz is mainly used in the United States, 50 Hz is used in England, Germany, France, and Italy, and 50 Hz and 60 Hz are used in Japan. Therefore, when the photometry cycle is adjusted to 50 Hz in the device, a large photometry error is generated in the region of 60 Hz, and vice versa.

On the other hand, since the number of divisions of the photometry element is very large, the reading time per photometered value is prolonged as large as about the flicker cycle.

FIG. 13A shows the photometry timings when the photometry cycle is 10 ms and the average value of two photometered values is calculated in the case of a 50-Hz power supply. FIG. 13B shows a case having the same condition as in FIG. 13A but a different flicker phase. In this manner, when the photometry cycle is substantially equal to the flicker cycle, a photometry operation may be performed at a valley of the flicker cycle, as shown in FIG. 13A, or a photometry operation may be performed at a peak of the flicker cycle, as shown in FIG. 13B. In either case, the photometered result has a considerably large error with respect to the average photometered value.

In order to prevent this problem, in FIG. 13C, the photometry cycle is set to be 1.5 times the flicker cycle, so that the average value approaches the root-mean-square value. However, in this case as well, as shown in FIG. 13D, when the power supply frequency is 60 Hz, the photometry cycle cannot become 1.5 times the flicker cycle, resulting in a large photometry error.

FIGS. 14A and 14B show photometry errors in arbitrary phases respectively at the power supply frequencies of 50 Hz and 60 Hz when the photometry cycle is 15 ms. Note that the flicker phase of illumination is assumed to be the absolute value of a sine wave by approximation.

FIG. 14A shows a case wherein the power supply frequency is 50 Hz. For example, when the time along the abscissa is 0 ms, the illumination light intensity is "0", and the photometered result is an average of "0" at time=0 ms and "1" as the illumination light intensity 15 ms later, i.e., "0.5". On the other hand, when time=5 ms, the illumination light intensity is "1", and the photometered result is an average of "1" at time=5 ms and "0" at time=20 ms, i.e., "0.5".

In this manner, when photometry operations are performed at the photometry cycle of 15 ms at the power supply frequency of 50 Hz, the photometered result deviates from the average flicker intensity by only a maximum of 0.35 EV even when the photometry operation starts from an arbitrary flicker phase.

However, as shown in FIG. 14B, when the power supply frequency is 60 Hz, the photometered result deviates from the average value by a maximum of 1.11 EV depending on the flicker phase at the beginning of photometry.

As shown in FIGS. 13E and 13F, when the photometry cycle is set to be 12.5 ms that is 1.5 times the flicker cycle at the power supply frequency of 60 Hz, the maximum error is 0.35 EV in the case of 60 Hz, as shown in FIG. 15B, but the maximum error becomes as large as 0.85 EV in the case of 50 Hz, as shown in FIG. 15A.

Note that a method of reducing an error by adjusting the photometry cycle to 55 Hz as an intermediate value of 50 Hz and 60 Hz may be used. However, in this case, as shown in FIGS. 16A and 16B, a maximum photometry error of 0.48 EV is generated at both 50 Hz and 60 Hz.

SUMMARY OF THE INVENTION

It is an object of the present invention to provide a photometry device which can output a photometered value by one photometry operation, and to provide a camera comprising an exposure controller which can output a photometered value by one photometry operation without being influenced by flickering.

In order to achieve the above object, a photometry device according to the first aspect of the present invention comprises a photometry unit for performing a photometry operation of an object field using an accumulation type photometry element, and an accumulation time determination unit for determining the accumulation time of the photometry element. The accumulation time determination unit determines the value of the accumulation time for the next photometry operation by calculating a weighted average of the accumulation times in previous photometry operations. Since the value of the accumulation time for the next photometry operation is determined by calculating a weighted average of the accumulation times in previous photometry operations, the influence of flickering of an illumination light source can be eliminated, and a photometered value can be output within a short period of time.

Preferably, the photometry device further comprises a discrimination unit for discriminating if the current photometry operation of the photometry unit is the first photometry operation after the beginning of the photometry operation. The accumulation time determination unit determines the value of the accumulation time for the next photometry operation by calculating a weighted average of the accumulation times in previous photometry operations when the discrimination unit discriminates that the current photometry operation of the photometry unit is not the first photometry operation after the beginning of the photometry operation. It is checked if the current photometry operation is the first one after the beginning of the photometry operation, and if it is determined that the current photometry operation is not the first one, the value of the accumulation time for the next photometry operation is determined by calculating a weighted average of the accumulation times in previous photometry operations. For this reason, a photometered value can be output within a short period of time without being influenced by flickering.

In one mode of the present invention, the photometry device further comprises a light source discrimination unit for discriminating if a light source for illuminating an object field is a light source having a flicker cycle. The accumulation time determination unit determines the value of the accumulation time for the next photometry operation by calculating a weighted average of the accumulation times in previous photometry operations when the light source discrimination unit discriminates that the light source is a light source having a flicker cycle. In this case, it is checked if the light source for illuminating the object field is one having a flicker cycle, and if it is determined that the light source is one having a flicker cycle, the value of the accumulation time for the next photometry operation is determined by calculating a weighted average of the accumulation times in previous photometry operations. For this reason, if it is determined that the light source does not have any flicker cycle, a photometry operation can be performed in a short response time.

In each of the above-mentioned devices, the value of the accumulation time for the next photometry operation is preferably determined by calculating a weighted average of accumulation times determined at least immediately before the current photometry operation, since a photometered value can be output within a very short period of time. If the accumulation time for the next photometry operation is determined using a photometered value determined immediately before the current photometry operation, a photometry operation which is hardly influenced by flickering can be attained in correspondence with a change in luminance of the object field.

In each of the above-mentioned devices, if the value of the accumulation time for the next photometry operation is determined by calculating a weighted average of the value calculated using the photometered value immediately before the current photometry operation and the value of the accumulation time immediately before the current photometry operation, a photometry operation which is hardly influenced by flickering can be attained in correspondence with a change in luminance of the object field.

In each of the above-mentioned devices, if a predetermined value of the accumulation time is output in the first photometry operation after the beginning of the photometry operation, a stable photometry operation can be assured even when no accumulation time immediately before the current photometry operation is stored.

In each of the above-mentioned devices, if the accumulation time determination unit sets a duration roughly corresponding to one flicker cycle to be the value of the accumulation time in the first photometry operation after the beginning of the photometry operation, a photometered value which is hardly influenced by flickering can be obtained even in the first photometry operation.

Furthermore, the scope of the present invention includes a camera which comprises one of the above-mentioned photometry devices and an exposure controller for performing exposure control of a film on the basis of the output from the photometry device.

It is another object of the present invention to provide a photometry device which can minimize a photometry error independently of regions with different power supply frequencies, and to provide a camera which can minimize a photometry error and can attain accurate exposure control independently of regions with different power supply frequencies.

In order to achieve the above object, a photometry device according to the second aspect of the present invention includes a photometry circuit for performing a photometry operation of an object field using a photometry element, and a calculation circuit which calculates a photometered output by averaging a plurality of outputs at different times from the photometry circuit. The calculation circuit averages the outputs from the photometry circuit at a cycle with which a larger one of the following two maximum values assumes a minimal value. Namely, one of the two maximum values is a maximum value of a photometered value error from a root-mean-square value upon photometry of a light source having a first flicker cycle with the photometry being started at an arbitrary phase point within the first flicker cycle, and the other of said two maximum values is a maximum value of a photometered value error from a root-mean-square value upon photometry of a light source having a second flicker cycle with the photometry being started at an arbitrary phase point within the second flicker cycle.

According to the present invention, since the calculation circuit averages the outputs from the photometry circuit at a cycle in which a larger one of a maximum value of an error, from a root-mean-square value, of a photometered output obtained in a photometry operation having an arbitrary phase of the first flicker cycle as a photometry start point, and a maximum value of an error, from a root-mean-square value, of a photometered output obtained in a photometry operation having an arbitrary phase of the second flicker cycle as a photometry start point, assumes a minimal value, photometered results with small errors can be obtained independently of regions with different power supply frequencies.

In this device, the photometry circuit preferably uses an accumulation type photometry element since the number of photometry regions can be increased.

The calculation circuit preferably averages the outputs from the photometry circuit at the above-mentioned cycle when the accumulation time of the photometry element is shorter than a predetermined value, since an accurate photometry operation can be assured in the case of a short accumulation time that is easily influenced by the power supply frequency.

The calculation circuit preferably selectively uses one of a plurality of cycles, since the photometry cycle can be flexibly changed.

The calculation circuit preferably switches the cycle in correspondence with the duration of the accumulation time of the photometry element since the photometry cycle can be flexibly changed.

The calculation circuit preferably switches the number of average times in correspondence with the duration of the accumulation time of the photometry element since the photometry cycle can be flexibly changed.

Furthermore, the scope of the present invention includes a camera which comprises the above-mentioned photometry device and an exposure controller for performing exposure control of a film on the basis of the output from the photometry device.

BRIEF DESCRIPTION OF THE DRAWINGS

FIG. 26 is a graph for explaining a conventional photometry device.

DETAILED DESCRIPTION OF THE PREFERRED EMBODIMENTS

The preferred embodiments of the first aspect of the present invention will be described hereinafter with reference to the accompanying drawings.

(First Embodiment)

Figure 1:
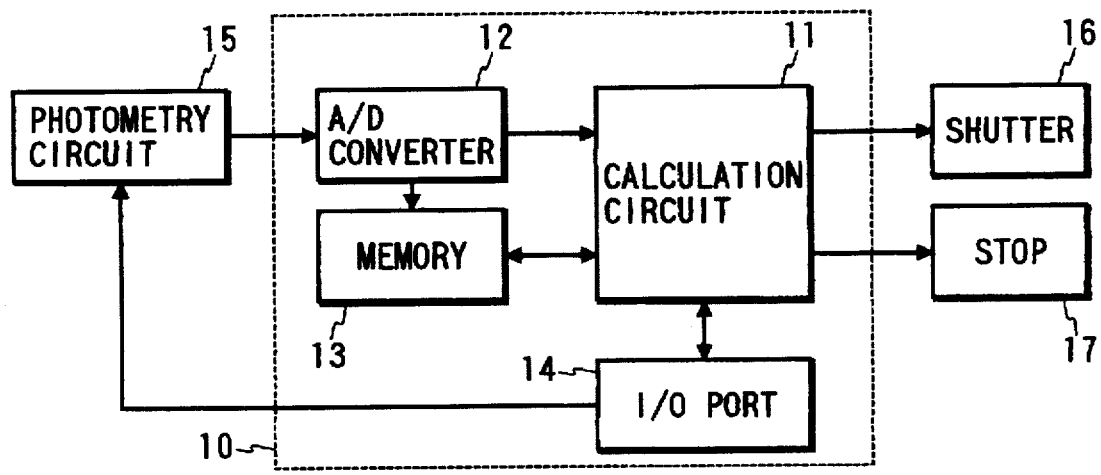
FIG. 1 is a block diagram showing the arrangement of a photometry device according to the first embodiment of the present invention.

FIG. 1 is a schematic block diagram showing the arrangement of a photometry device for a camera according to the first embodiment of the present invention.

A microprocessor 10 is a control circuit for performing various kinds of control and calculations in the camera. The microprocessor 10 incorporates a calculation circuit 11 for executing calculations, an A/D converter 12 for converting an analog voltage into a digital value, a memory 13, an I/O port 14, and the like. All the operations of the microprocessor 10 are controlled in accordance with programs stored in the memory 13.

A photometry circuit 15 includes a photometry element 9 (see FIG. 3), and accumulation control of the photometry element 9 is performed by the microprocessor 10 via the I/O port 14. The output from the photometry circuit 15 is A/D-converted by the A/D converter 12, and the converted data is stored in the memory 13. The calculation circuit 11 calculates luminance values in units of photometry regions on the basis of photometry data in the memory 13, and calculates an appropriate exposure value based on the calculated data. The programs in the microprocessor 10 will be described in detail later.

The calculation circuit 11 controls the driving operations of a shutter 16 and a stop 17 on the basis of the appropriate exposure value (exposure controller).

Figure 2:
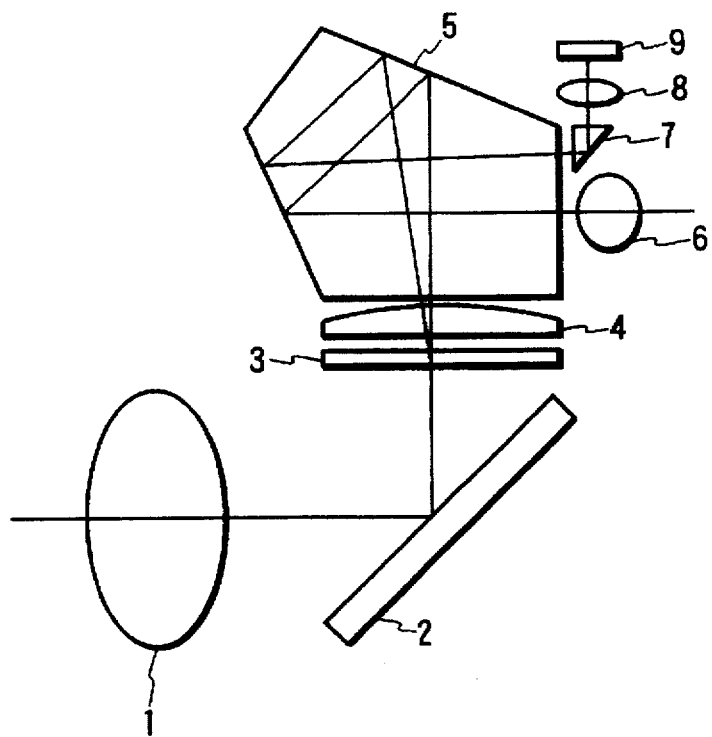
FIG. 2 is a view showing the optical system of the photometry device according to the first embodiment.

FIG. 2 is a view showing the optical system of the camera which incorporates the photometry device according to this embodiment.

A light beam transmitted through a phototaking lens 1 reaches the eye of a photographer via a quick return mirror 2, a diffusion screen 3, a condenser lens 4, a pentagonal prism 5, and an eyepiece 6. On the other hand, some light components of the light beam are diffused by the diffusion screen 3, and then reach a light-receiving element 9 via the condenser lens 4, the pentagonal prism 5, a photometry prism 7, and a photometry lens 8.

Figure 3:
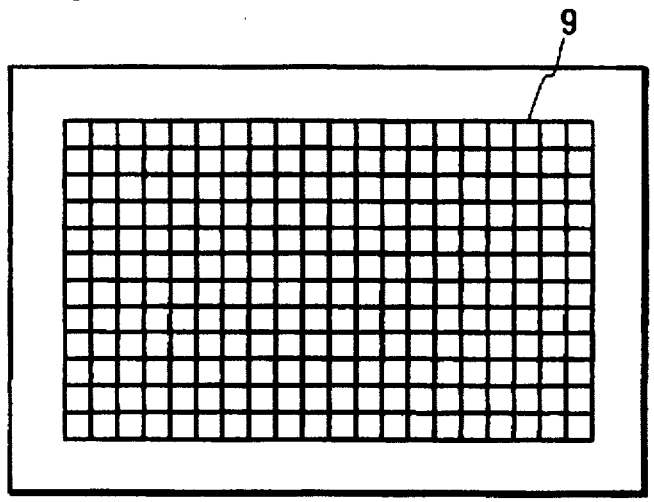
FIG. 3 is a view showing the division state of a photometry unit of the photometry device according to the first embodiment.

FIG. 3 shows the division state of the photometry element of the photometry device according to this embodiment in correspondence with an object field.

The photometry element 9 comprises, e.g., an accumulation type sensor such as a CCD, and has a total of 240 regions (=12 regions divided in the vertical direction×20 regions divided in the horizontal direction).

Figure 4:
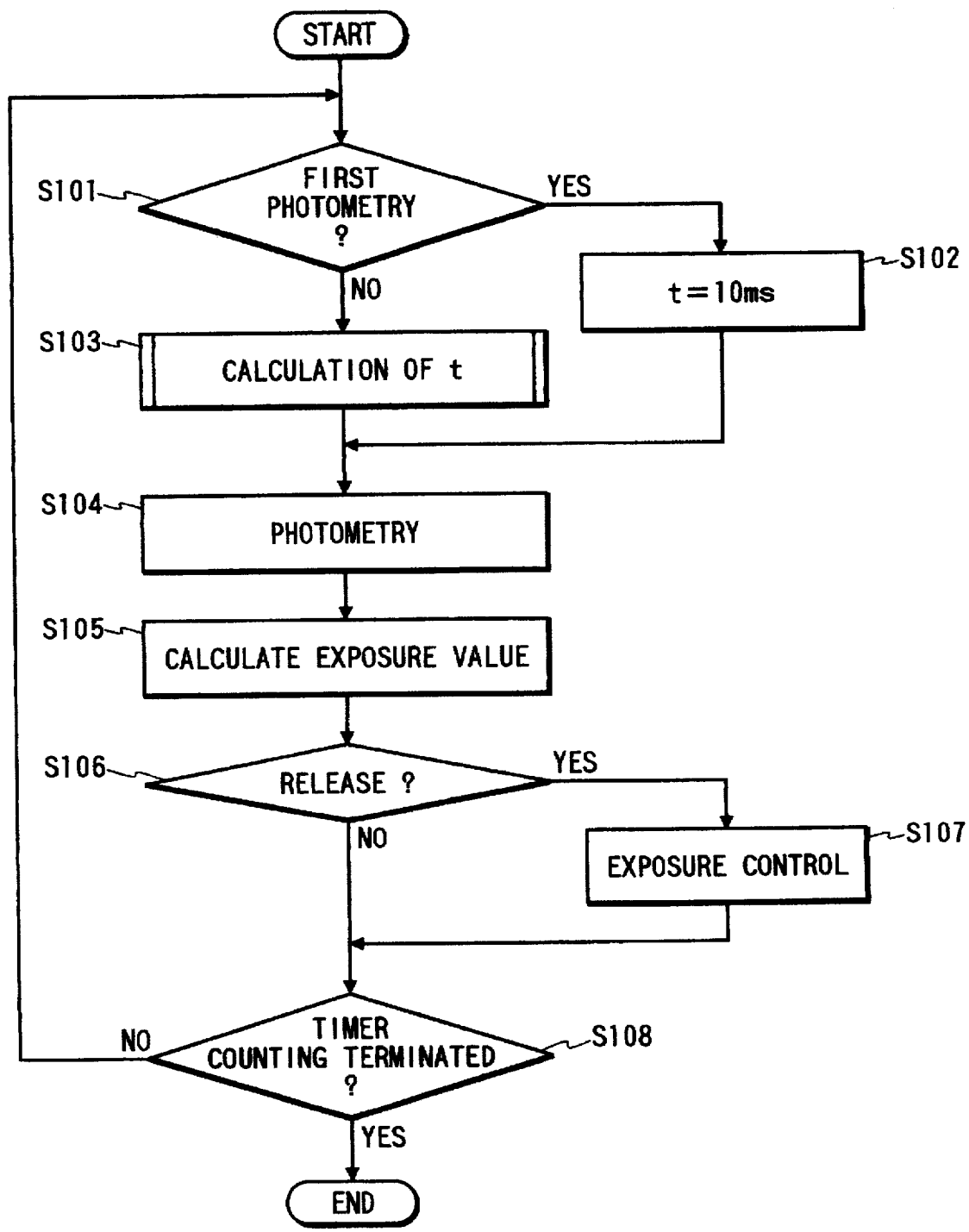
FIG. 4 is a flow chart showing the algorithm of the photometry device according to the first embodiment.

FIG. 4 is a flow chart showing the program of the microprocessor 10 of the photometry device according to this embodiment.

This program is executed when a release button (not shown) of the camera is depressed to its half stroke position and the power supply of the camera is turned on.

In step S101, it is checked if the current photometry operation is the first photometry operation after the power supply is turned on. If Y (YES) in step S101, the accumulation time, t, is set to be 10 ms in step S102. The accumulation time=10 ms roughly corresponds to one flicker cycle. When this accumulation time is set as long as about the flicker cycle, high and low intensity portions of flickering cancel each other during accumulation, and a photometered value which is hardly influenced by flickering can be obtained. In particular, in the first photometry operation, since the photometry condition is unknown, it is important to obtain a photometered value which is hardly influenced by flickering in terms of the subsequent stable photometry operations.

On the other hand, if N (NO) In step S101, the flow advances to step S103, and the accumulation time t is calculated. The method of calculating the accumulation time t will be described in detail later.

In step S104, the photometry operation is performed based on the accumulation time calculated in step S103, and luminance values of the 240 regions are calculated. In step S105, an appropriate exposure value is calculated based on these luminance values. Since the method of calculating an appropriate exposure value is described in detail in Japanese Patent Application Laid-Open No. 6-95200 proposed by the present applicant, a detailed description thereof will be omitted.

In step S106, it is checked if the release button is depressed to its full stroke position. If Y in step S106, the exposure control of the shutter 16 and the stop 17 is performed based on the calculated appropriate exposure value in step S107. Thereafter, it is checked in step S108 if an internal timer for measuring a predetermined time after the half depression state of the release button is released has reached a time-out state. If N in step S108, the flow returns to step S101 to repeat the above-mentioned processing; otherwise, the program ends.

Figure 5:
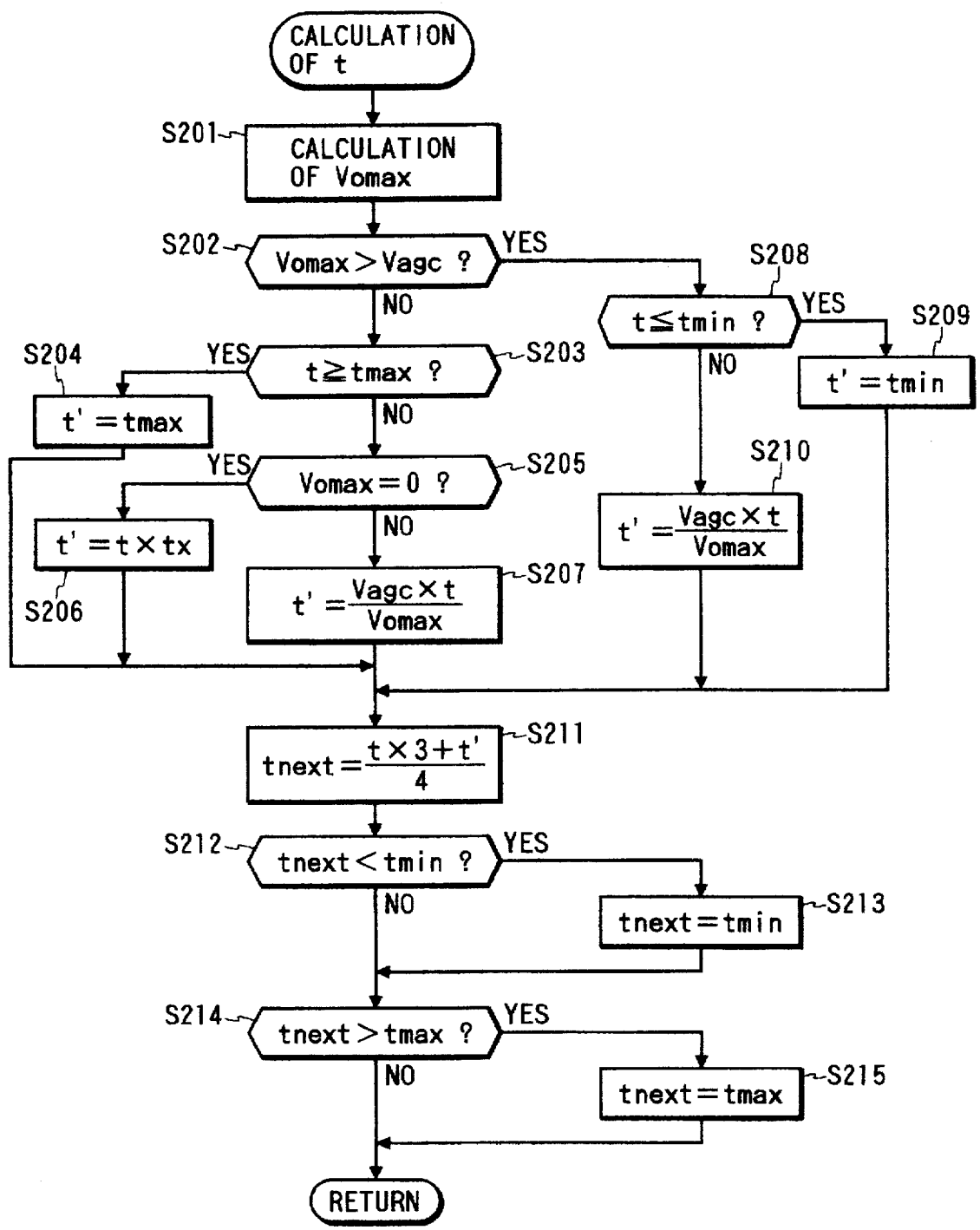
FIG. 5 is a flow chart showing step S103 (the subroutine for calculating the next accumulation time t) in FIG. 4.

FIG. 5 is a flow chart showing step S103 (the subroutine for calculating the next accumulation time t) in FIG. 4.

This subroutine is called and executed upon execution of step S103 in FIG. 4. Since at least one photometry operation has been performed after the power supply was turned on before this subroutine is called, the immediately preceding photometered values are left in the memory 13. In step S201, a maximum value Vomax is obtained from the immediately preceding photometered values left in the memory 13.

It is checked in step S202 if the value Vomax is larger than a predetermined value Vagc. The value Vagc is a target value of Vomax, and is set to be about 3 V in the case of a photometry element whose saturated output is about 3.4 V. If N in step S202, it is checked in step S203 if the previous accumulation time t is equal to or larger than a predetermined value tmax. Note that tmax is the maximum accumulation time, and is set to fall within the range from 100 ms to 300 ms for easy system implementation.

If Y in step S203, tmax is substituted in the next accumulation time candidate value t' in step S204. In step S205, it is checked if Vomax=0, i.e., if all the photometry values are "0". If Y in step S205, a value obtained by multiplying t with tx is substituted in t' in step S206. Note that tx is a constant having a value of about 4. In step S207, the next accumulation time candidate value t' is calculated using equation (1) below:

$$t' = Vagc \times t / Vomax \tag{1}$$

If Y in step S202, it is checked in step S208 if the previous accumulation time t is equal to or smaller than tmin. Note that tmin is the minimum accumulation time, and is set to be about 10 μs. If Y in step S208, tmin is substituted in t' in step S209; otherwise, t' is calculated using equation (1) in step S210 as in step S207.

In step S211, a weighted average of the next accumulation time candidate value t' and the previous accumulation time candidate value t is calculated using equation (2) below to obtain the next accumulation time value tnext:

$$tnext = (t \times 3 + t')/4 \tag{2}$$

In this case, the ratio of the weighted average is set to be 3:1. Since this value is closely related to, e.g., the photometry cycle, it is preferably adjusted in correspondence with the system of interest.

In step S212, it is checked if tnext is smaller than tmin. If Y in step S212, tnext is rewritten by tmin in step S213. Similarly, it is checked in step S214 if tnext is larger than tmax. If Y in step S214, tnext is rewritten by tmax in step S215, thus ending the processing.

(Second Embodiment)

Figure 6:
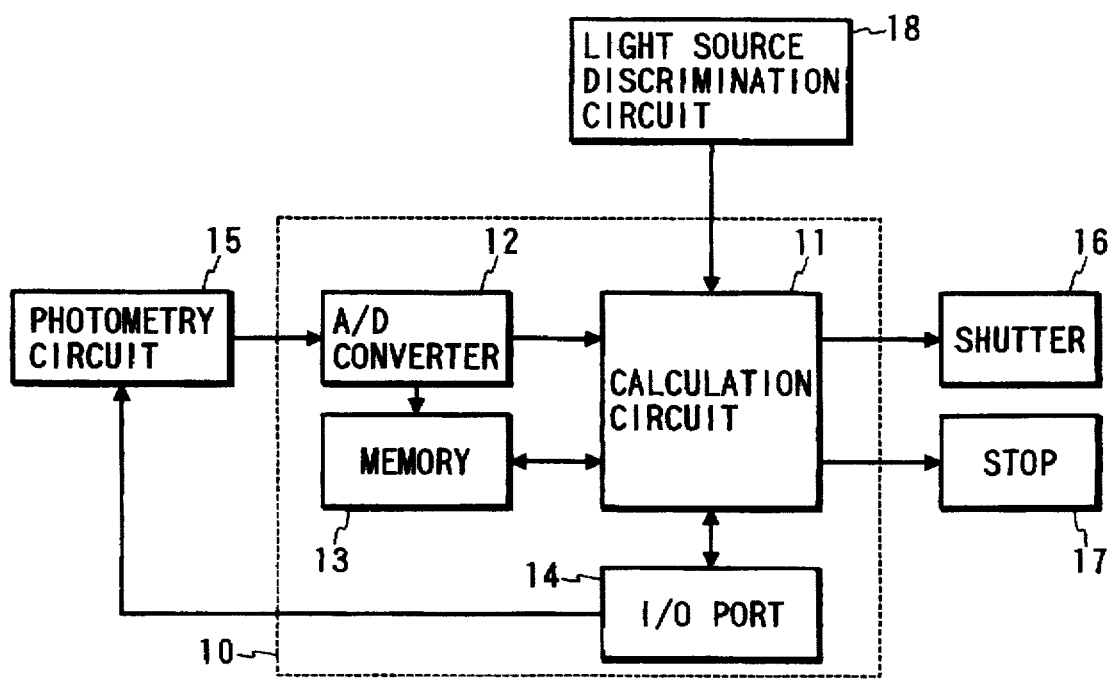
FIG. 6 is a block diagram showing the arrangement of a photometry device according to the second embodiment of the present invention.
Figure 7:
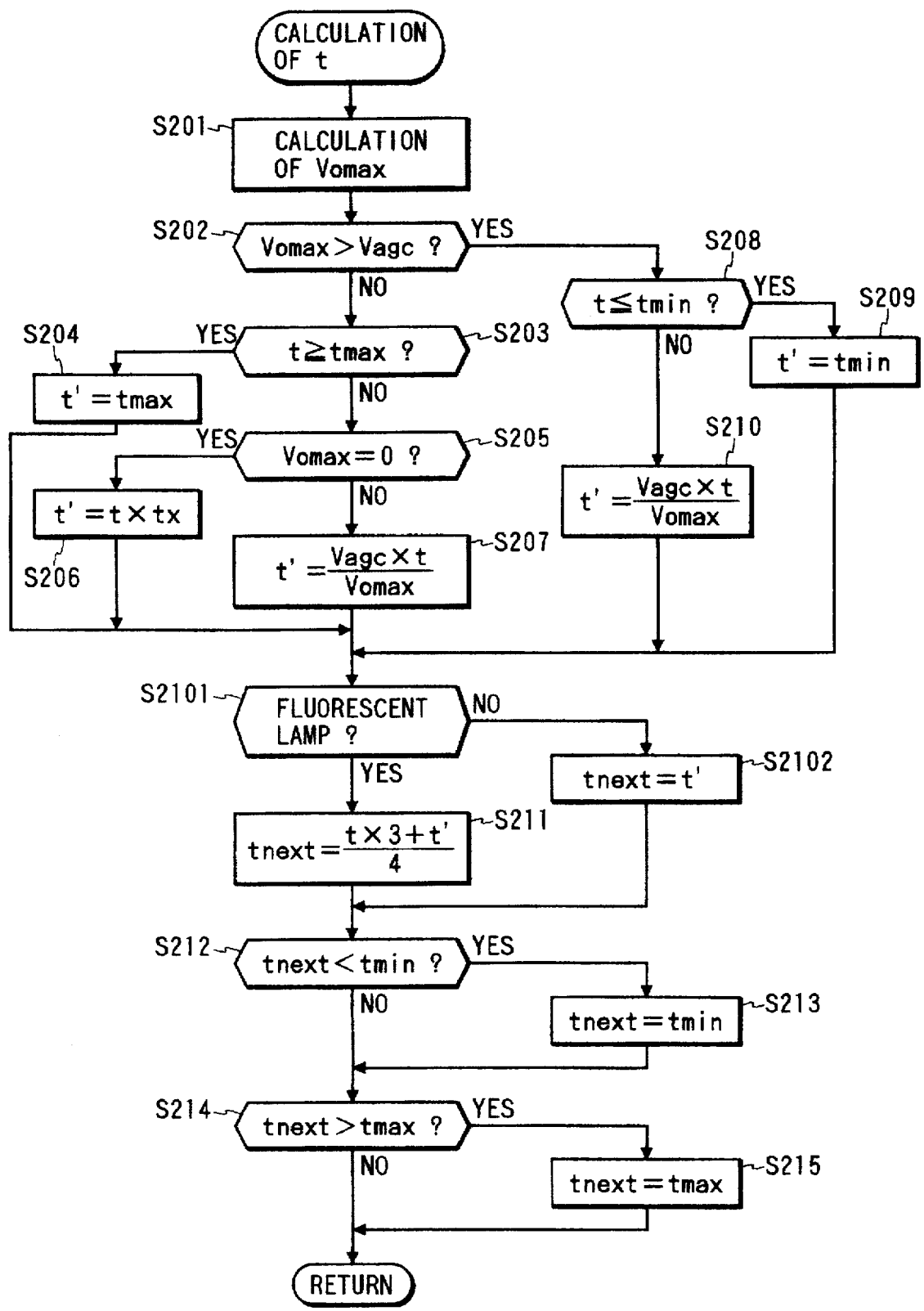
FIG. 7 is a flow chart showing the subroutine for calculating the next accumulation time in the second embodiment.
Figure 8:
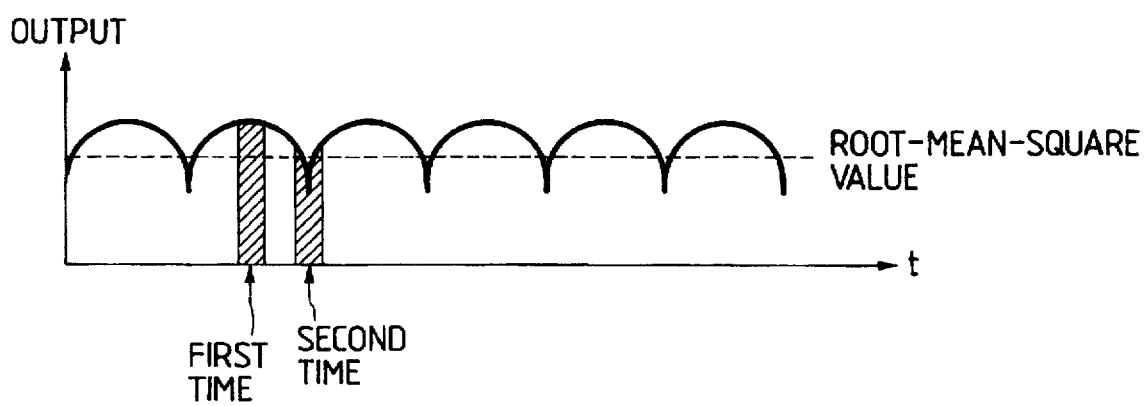
FIG. 8 is a graph for explaining an example of a conventional photometry device.

FIG. 6 is a schematic block diagram showing the arrangement of a photometry device for a camera according to the second embodiment of the present invention, and FIG. 7 is a flow chart showing the subroutine for calculating the next accumulation time of the photometry device for the camera according to the second embodiment.

Note that the same reference numerals in this embodiment denote parts having the same functions as those in the first embodiment described above, and a repetitive description thereof will be avoided.

In the second embodiment, a light source discrimination circuit 18 is arranged, and its output is connected to the calculation circuit 11 of the microcomputer 10.

The light source discrimination circuit 18 is a circuit for discriminating if a light source for illuminating an object field is one having a flicker cycle. The light source discrimination circuit 18 may comprise a circuit for detecting light source light using, e.g., photodetectors having red (R), green (G), blue (B), and yellow (Y) spectrum characteristics, and discriminating based on the output ratio of R to B and the output ratio of B to Y if the light source is a fluorescent lamp (Japanese Patent Application Laid-Open No. 63-236931).

In step S2101, it is checked if the light source is a fluorescent lamp. If Y in step S2101, the flow advances to step S211; otherwise, the flow advances to step S2102 to set tnext=t. Thereafter, the flow jumps to step S212.

According to the second embodiment, when the light source is not a fluorescent lamp, and has no flicker cycle, a normal photometry operation can be performed in a short response time.

(Another Embodiment)

In each of the above embodiments, upon calculation of the next accumulation time tnext, the weighted average of the next and previous values is calculated, as shown in equation (2). Alternatively, as shown in equation (3) below, the next accumulation time may be calculated using a plurality of previous accumulation times:

$$tnext=(t[1]+t[2]+t[3]+t)/4 \qquad (3)$$

where t[n] is the accumulation time obtained in the photometry operation n times before the current photometry operation. In this case, tnext is calculated using three previous values, but may be adjusted in correspondence with the system of interest.

By combining equations (2) and (3), the weighted average may be calculated using a plurality of previous values and assigning larger weights to the newer values.

In each of these embodiments, the photometry circuit 15 corresponds to the photometry unit, the subroutine shown in FIG. 5 corresponds to the accumulation time determination unit, step S101 in FIG. 4 corresponds to the discrimination unit, and the light source discrimination circuit 18 corresponds to the light source discrimination unit.

The preferred embodiment of the second aspect of the present invention will be described below with reference to the accompanying drawings.

Figure 9:
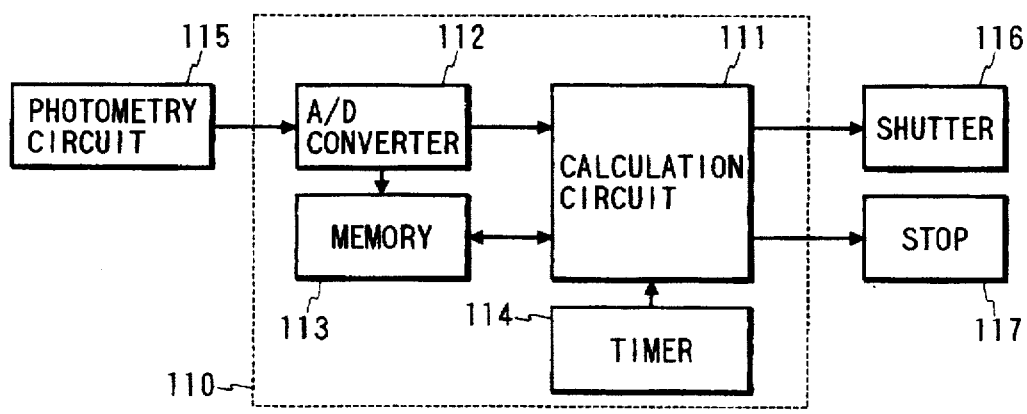
FIG. 9 is a block diagram showing the arrangement of a photometry device according to still another embodiment of the present invention.

FIG. 9 is a schematic block diagram showing the arrangement of a photometry device for a camera according to the embodiment of the present invention.

A microprocessor 110 is a control circuit for performing various kinds of control and calculations in the camera. The microprocessor 110 incorporates a calculation circuit 111 for executing calculations, an A/D converter 112 for converting an analog voltage into a digital value, a memory 113, a timer 114, and the like. All the operations of the microprocessor 110 are controlled in accordance with programs stored in the memory 113.

The output from a photometry circuit 115 is A/D-converted by the A/D converter 112, and the converted data is stored in the memory 113. The calculation circuit 111 starts the counting operation of the timer 114 simultaneously with the beginning of the first photometry operation, reads the next photometry data from the photometry circuit 115 via the A/D converter 112 after an elapse of a predetermined period of time, and stores the data in the memory 113 again. After a predetermined number of photometry data are read, the calculation circuit 111 calculates average values of data in units of photometry regions in the memory 113 to calculate photometered values. The programs in the microprocessor 110 will be described in detail later.

The calculation circuit 111 calculates an appropriate exposure value on the basis of the calculated photometered values, and controls the driving operations of a shutter 116 and a stop 117 (exposure controller).

Figure 10:
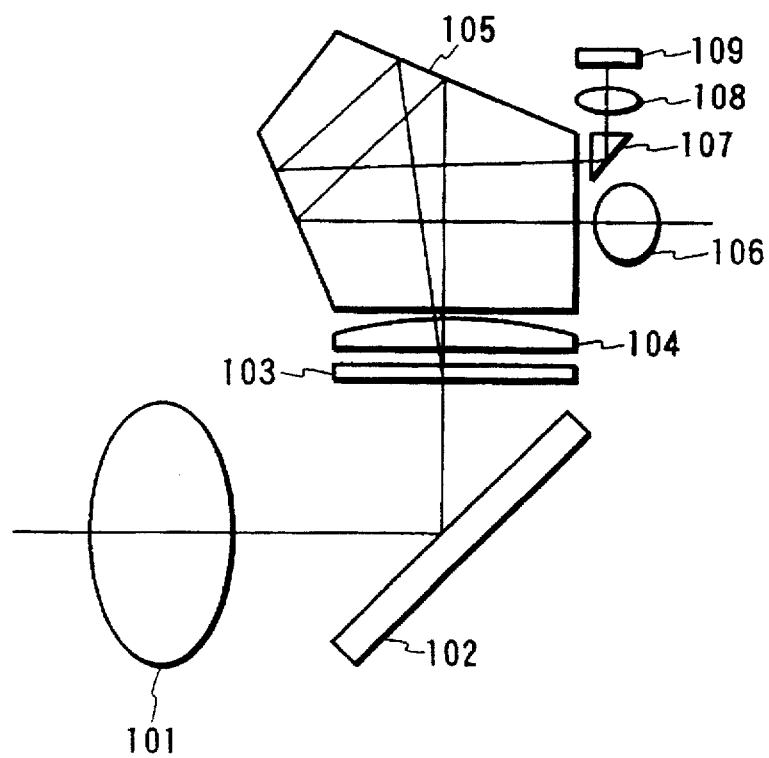
FIG. 10 is a view showing the optical system of the photometry device according to the embodiment shown in FIG. 9.

FIG. 10 is a block diagram showing the optical system of the camera which incorporates the photometry device according to this embodiment.

A light beam transmitted through a phototaking lens 101 reaches the eye of a photographer via a quick return mirror 102, a diffusion screen 103, a condenser lens 104, a pentagonal prism 105, and an eyepiece 106. On the other hand, some light components of the light beam are diffused by the diffusion screen 103, and then reach a light-receiving element 109 via the condenser lens 104, the pentagonal prism 105, a photometry prism 107, and a photometry lens 108.

Figure 11:
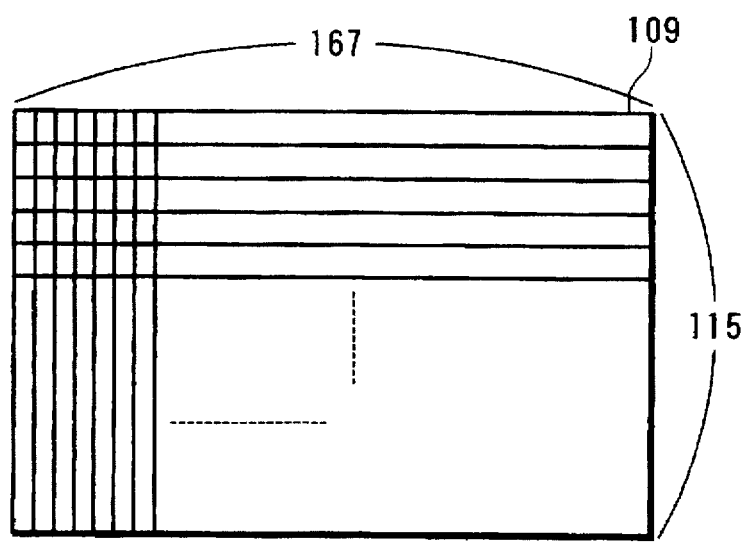
FIG. 11 is a view showing the division state of a photometry unit of the photometry device according to the embodiment shown in FIG. 9.

FIG. 11 shows the division state of the photometry element 109 in correspondence with an object field.

The photometry element 109 comprises, e.g., an accumulation type sensor such as a CCD, and has a total of 1,005 regions (=15 regions divided in the vertical direction×67 regions divided in the horizontal direction).

Figure 12:
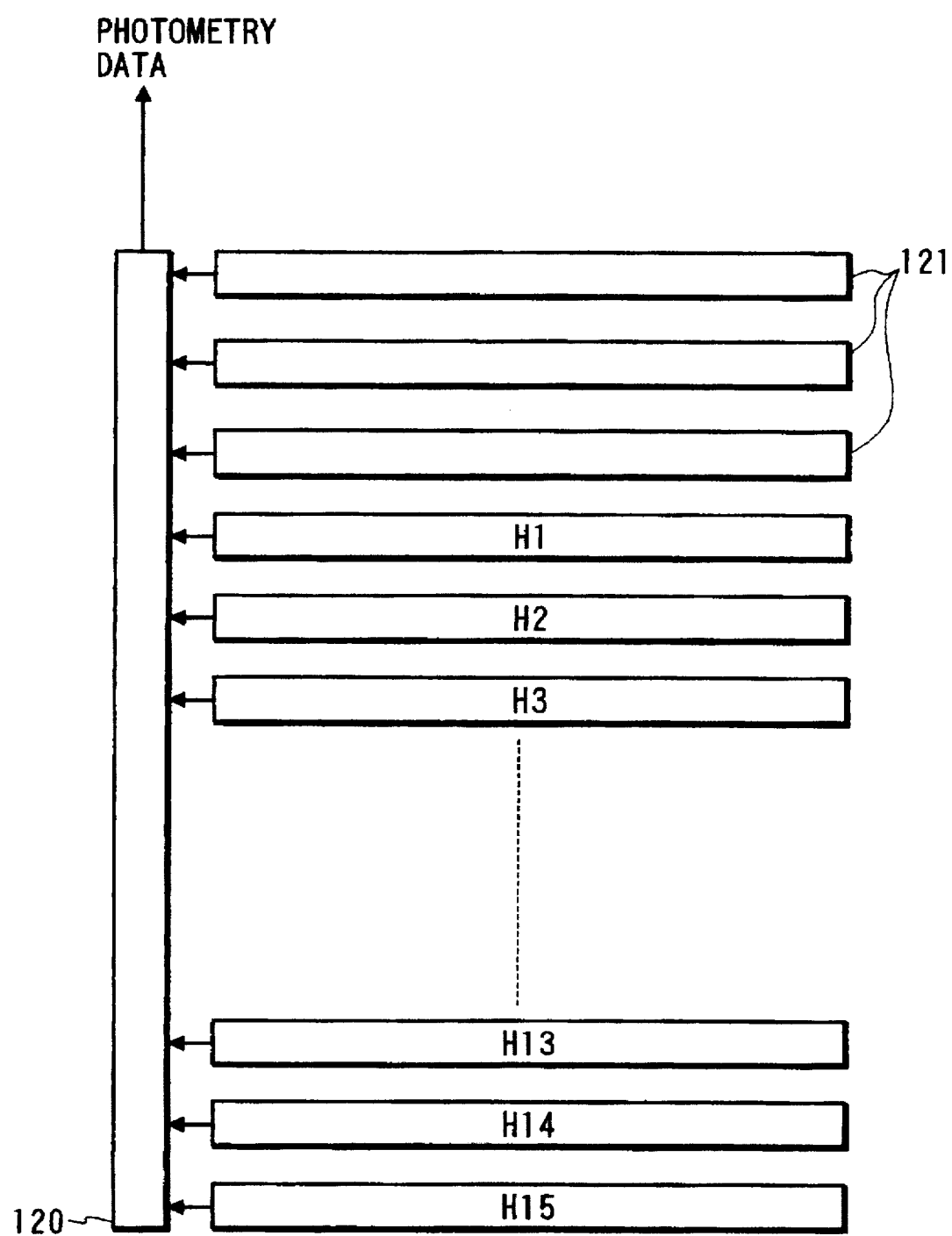
FIG. 12 is a view showing the internal arrangement of a photometry element of the photometry device according to the embodiment shown in FIG. 9.

FIG. 12 illustrates the internal state of the photometry element 109 in a simplified manner.

Photometry data are supplied from 15 H registers H1 to H15 to a V register 120 in units of pixels, and are serially output from the distal end of the V register 120 pixel by pixel. Furthermore, three data correction H registers 121 are arranged in the vicinity of the H register H1. Thus, in order to output data for one frame, the time for outputting data for 1,428 pixels including dummy pixels (not shown) is required.

Note that the time required for outputting data for one pixel is called a data rate. The duration of the data rate mainly depends on the conversion speed of the A/D converter 112 which receives data. Since the conversion speed of a fast A/D converter (112) currently available is about 10 μs, the time required for reading data for one frame is 14.28 ms. Since the photometry time must be determined in consideration of the accumulation time in addition to the time required for reading data, the photometry cycle must have a duration at least larger than 14.28 ms.

Figure 13A:
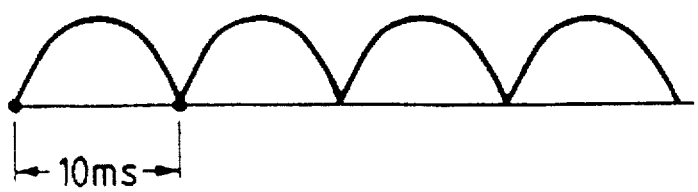
FIGS. 13A to 13F are graphs for explaining the photometry cycles.
Figure 13B:
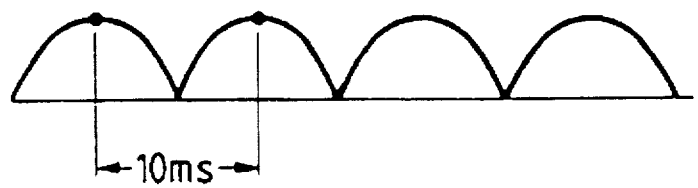
Figure 13C:
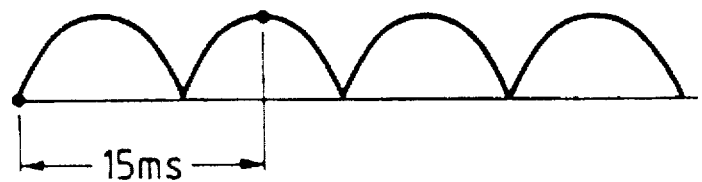
Figure 13D:
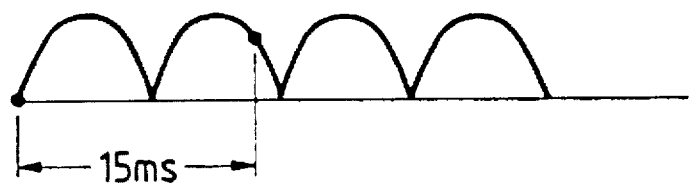

FIGS. 13A to 13F show the photometry timings when an average of two photometered values is calculated. FIGS. 13A and 13B show a case wherein an illumination light source using a 50-Hz power supply (England, Germany, France, Italy, and the like) is photometered at a 10-ms interval. In this manner, when the flicker cycle is equal to the photometry cycle, since two photometry operations are performed in phase with the flicker cycle, the photometered result considerably deviates from the average value of flickering depending on the flicker phase at the beginning of photometry. On the other hand, when the photometry cycle is set to be 1.5 times (15 ms) the flicker cycle, as shown in FIG. 13C, the average value obtained in the case of 50 Hz approaches a root-mean-square value. However, in this case as well, when the power supply frequency is 60 Hz (e.g., the United States), as shown in FIG. 13D, the photometry cycle does not become 1.5 times the flicker cycle, resulting in a large photometry error.

Figure 14A:
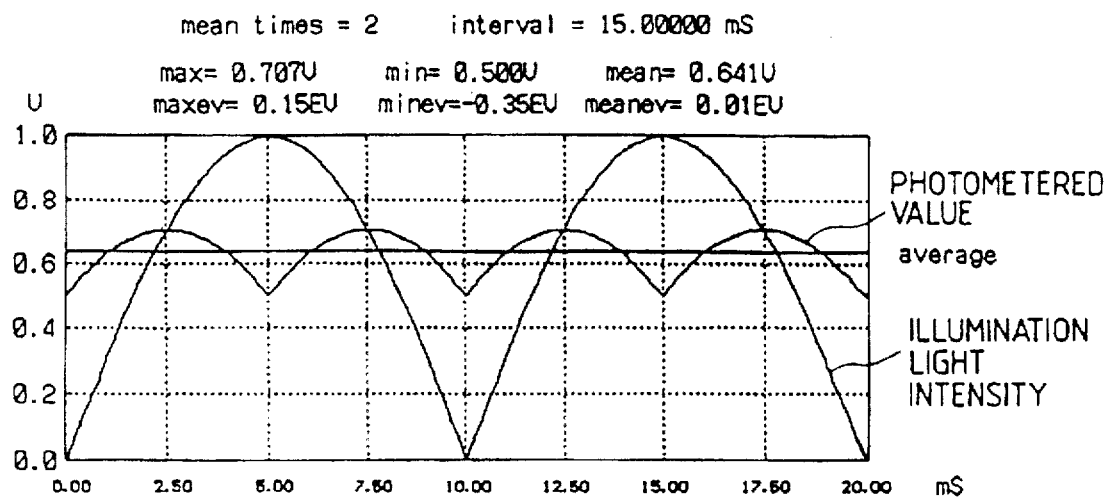
FIGS. 14A and 14B are graphs showing the simulation results of photometry errors caused by flickering.
Figure 14B:
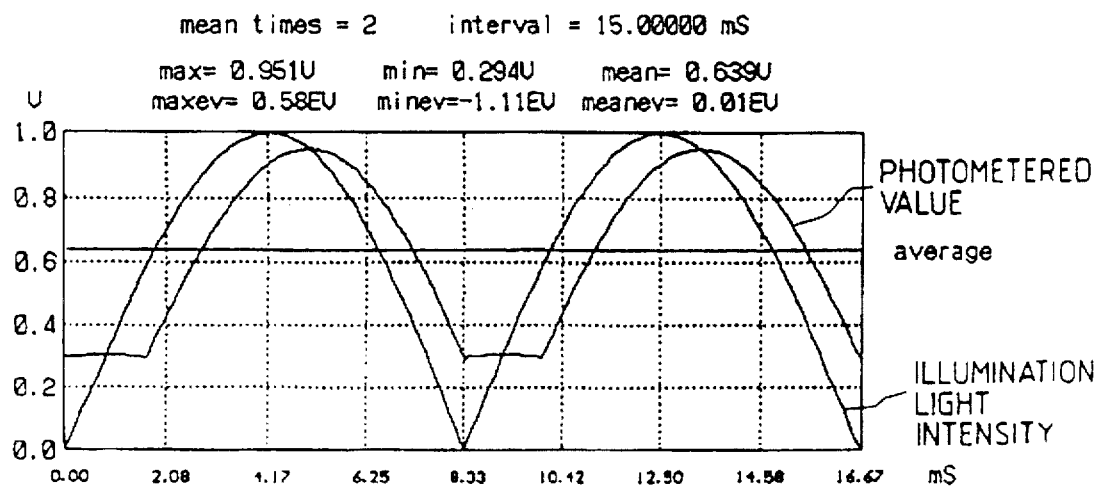

FIGS. 14A and 14B show photometry errors from the average value of flickering in arbitrary phases respectively at the power supply frequencies of 50 Hz and 60 Hz when the photometry cycle (or interval) is set to be 15 ms and the average value of two photometered values is calculated. Assume that the accumulation time in a photometry operation is sufficiently short, flickering of illumination is assumed to be the absolute value of a sine wave by approximation, and the output value is normalized with respect to 1 as a maximum value.

FIG. 14A is a graph at the power supply frequency of 50 Hz. For example, when the time along the abscissa is 0 ms, the illumination light intensity is "0", and the photometered result is an average of "0" at time=0 ms and "1" as the illumination light intensity 15 ms later, i.e., "0.5". On the other hand, when the time along the abscissa is 5 ms, the illumination light intensity is "1", and the photometered result is an average of "1" at 5 ms and "0" at 20 ms, i.e., "0.5". In this manner, when photometry operations are performed at the photometry cycle of 15 ms at the power supply frequency of 50 Hz, the photometered result deviates from the average flicker intensity by only a maximum of 0.35 EV even when the photometry operation starts from an arbitrary flicker phase.

However, as shown in FIG. 14B, when the power supply frequency is 60 Hz, the photometered result deviates from the average value by a maximum of 1.11 EV depending on the phase at the beginning of photometry.

Figure 13E:
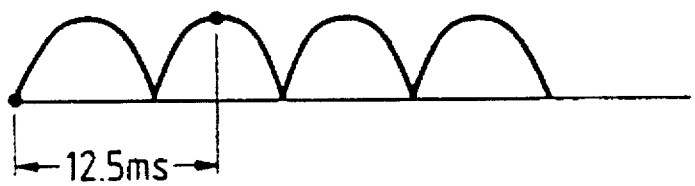
Figure 13F:
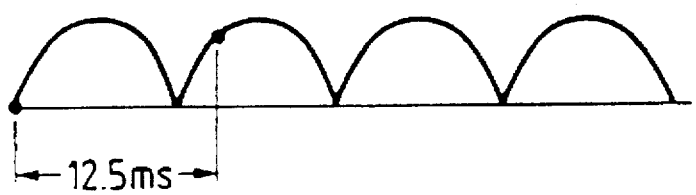
Figure 15A:
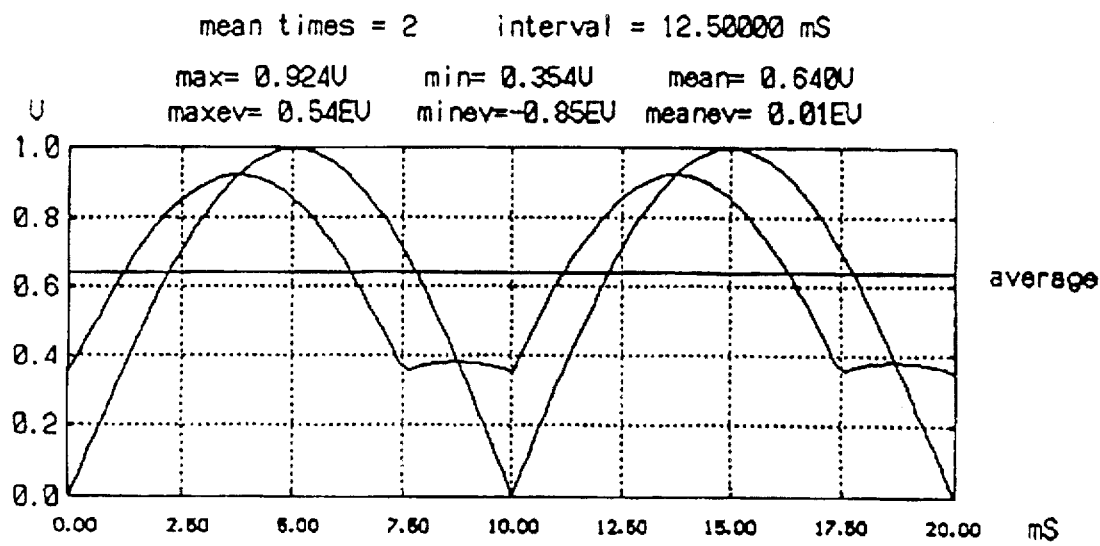
FIGS. 15A and 15B are graphs showing the simulation results of photometry errors caused by flickering.
Figure 15B:
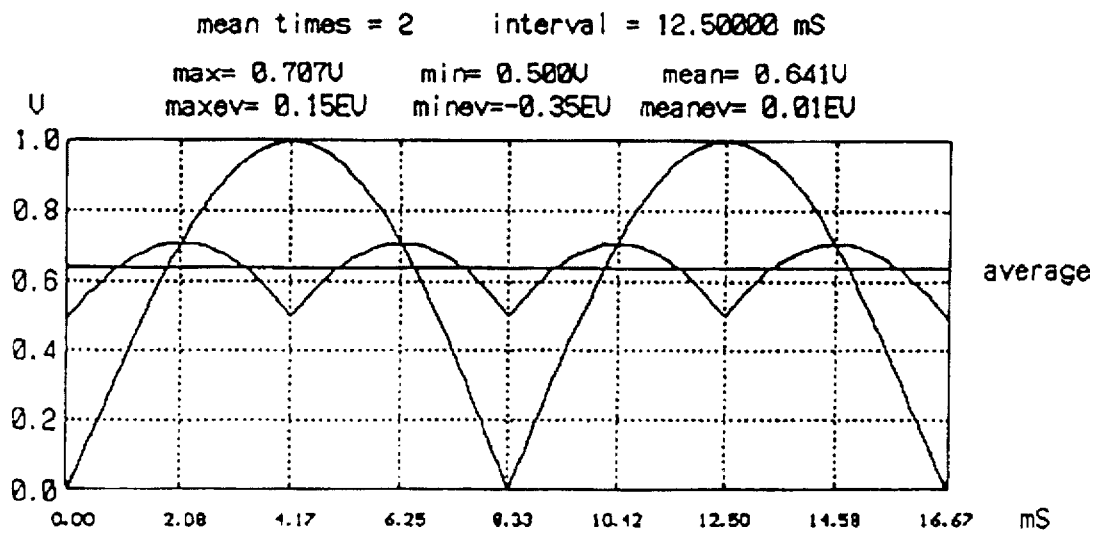

On the other hand, as shown in FIGS. 13E and 13F, when the photometry cycle is set to be 12.5 ms that is 1.5 times the flicker cycle at the power supply frequency of 60 Hz, the maximum error is 0.35 EV in the case of 60 Hz, as shown in FIG. 15B, but the maximum error becomes as large as 0.85 EV in the case of 50 Hz, as shown in FIG. 15A. Note that EV as a unit represents the logarithm of the ratio with respect to a reference value (in this case, the average value of flickering) to the base 2.

Figure 16A:
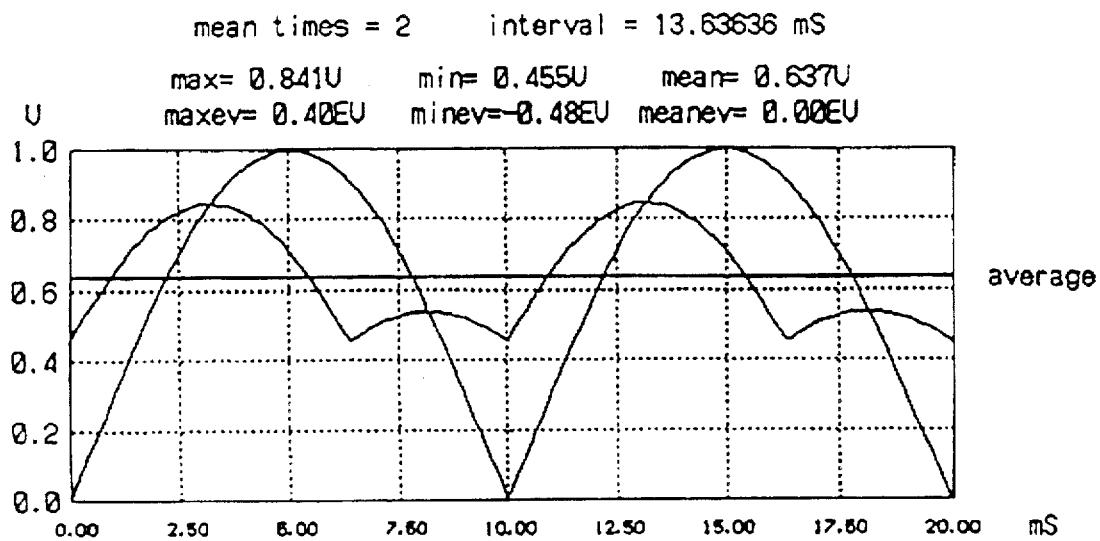
FIGS. 16A and 16B are graphs showing the simulation results of photometry errors caused by flickering.
Figure 16B:
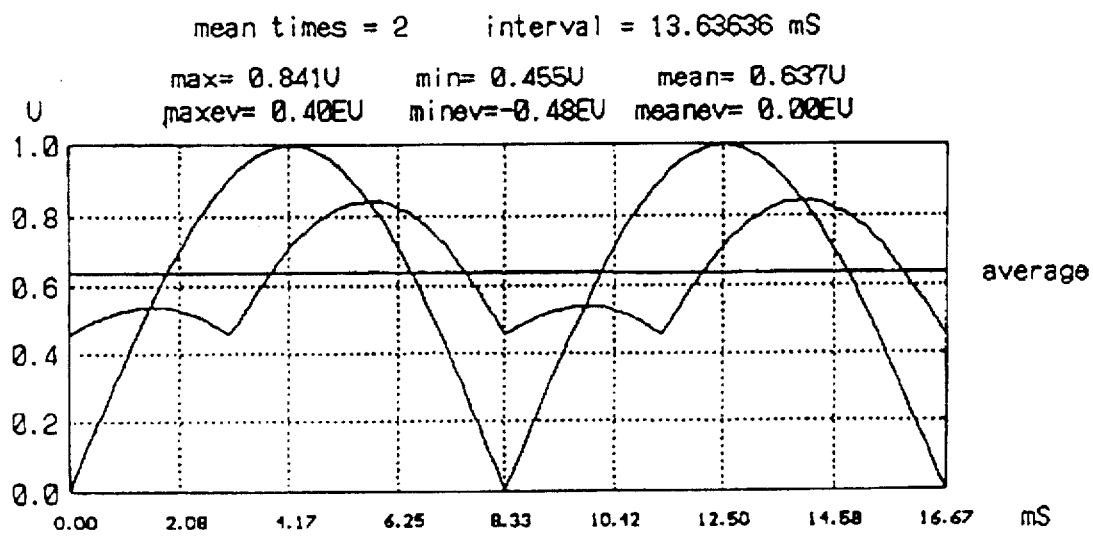

FIGS. 16A and 16B are graphs when the photometry cycle is set to be 1.5 times the flicker cycle at 55 Hz as an intermediate value of 50 Hz and 60 Hz, i.e., 13.63 ms, and two photometered values are averaged. In such a case, at both 50 Hz (FIG. 16A) and 60 Hz (FIG. 16B), a maximum of 0.48 EV is generated as a photometry error.

Figure 17A:
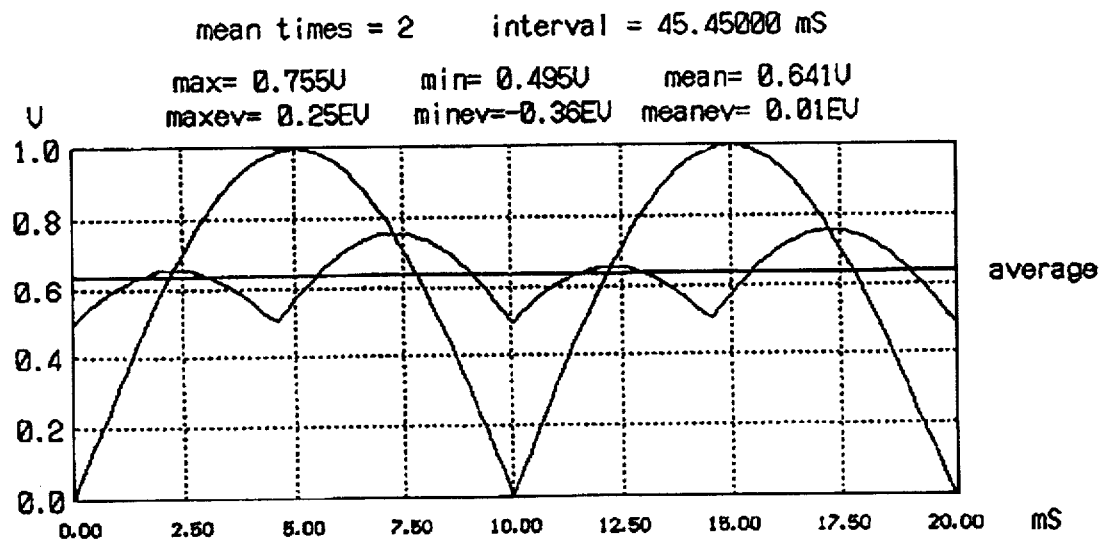
FIGS. 17A and 17B are graphs showing the simulation results of photometry errors caused by flickering.
Figure 17B:
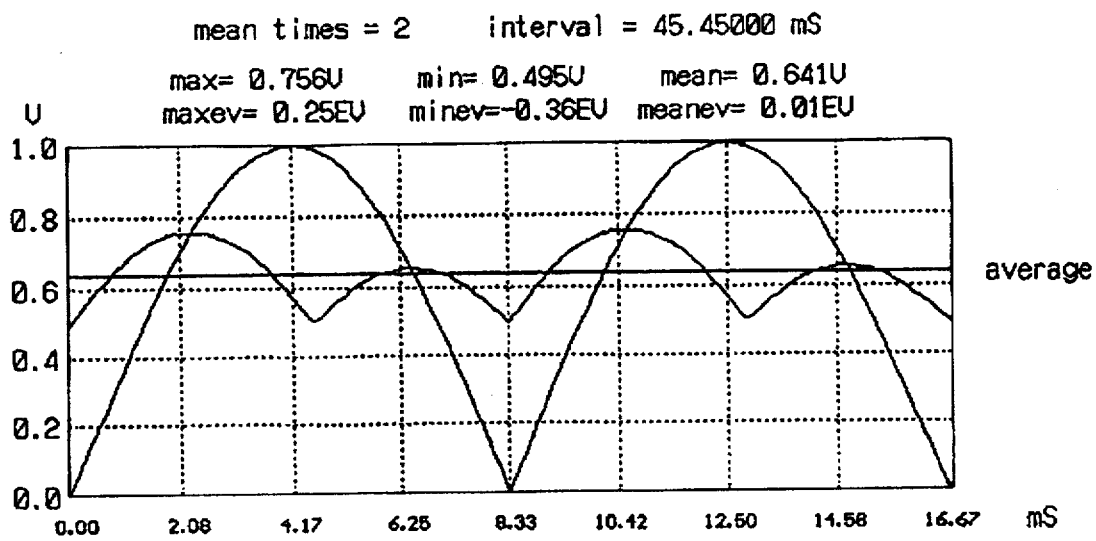

FIGS. 17A and 17B are graphs when the photometry cycle is set to be 45.45 ms, and two photometered values are averaged. In this case, at both 50 Hz (FIG. 17A) and 60 Hz (FIG. 17B), the maximum error from the average value is 0.36 EV, and a photometry operation with small errors can be assured independently of the photometry start phase.

Note that the average value is a value obtained by averaging the absolute values of the sine wave as a flicker over all the phases. Therefore, this average value indicates the height of the vertical axis obtained when the area bounded by the curve of the absolute values of the sine wave and the horizontal axis is replaced by a rectangle having an equal area, and is different from a so-called root-mean-square value. However, since the difference between the average value and root-mean-square value is small, and correction from the average value to the root-mean-square value is easy, this difference is negligible.

Figure 18A:
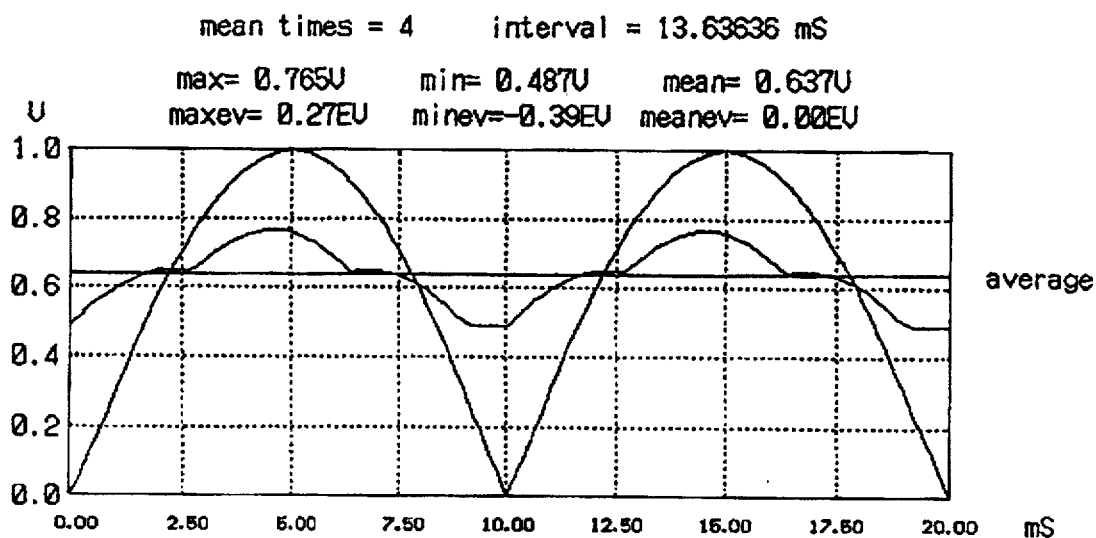
FIGS. 18A and 18B are graphs showing the simulation results of photometry errors caused by flickering.
Figure 18B:
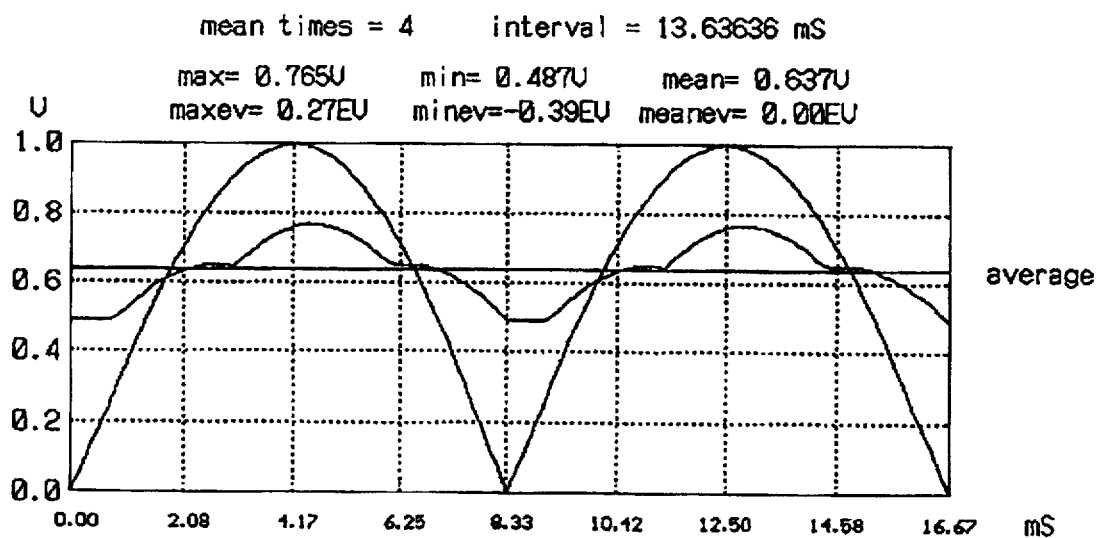

FIGS. 18A and 18B are graphs showing photometry errors obtained when four photometered values are averaged, and the photometry cycle is set to be 1.5 times the flicker cycle at 55 Hz, i.e., 13.63 ms. In this case, at both 50 Hz (FIG. 18A) and 60 Hz (FIG. 18B), a maximum of 0.39 EV is generated as an error.

Figure 19A:
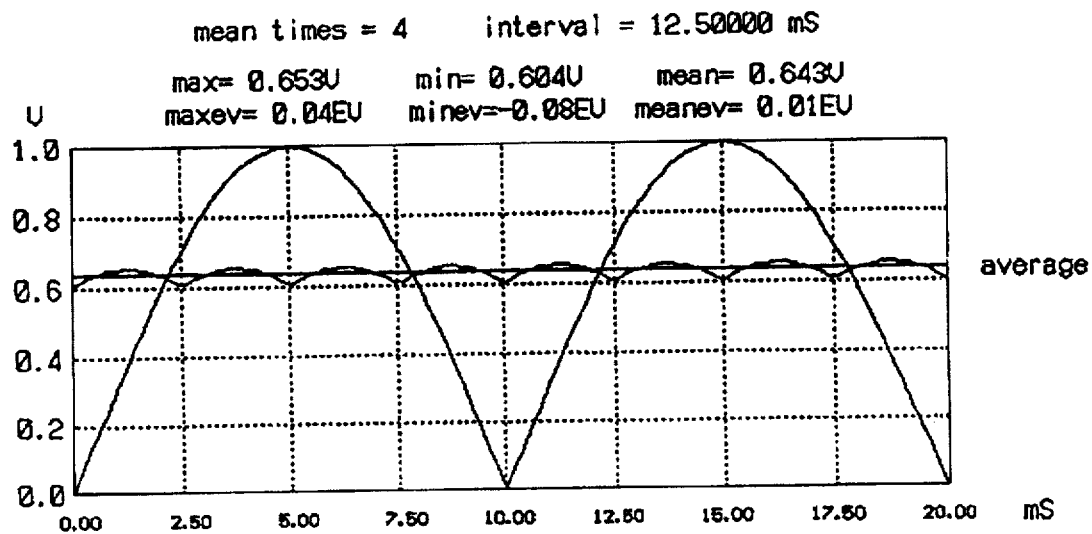
FIGS. 19A and 19B are graphs showing the simulation results of photometry errors caused by flickering.
Figure 19B:
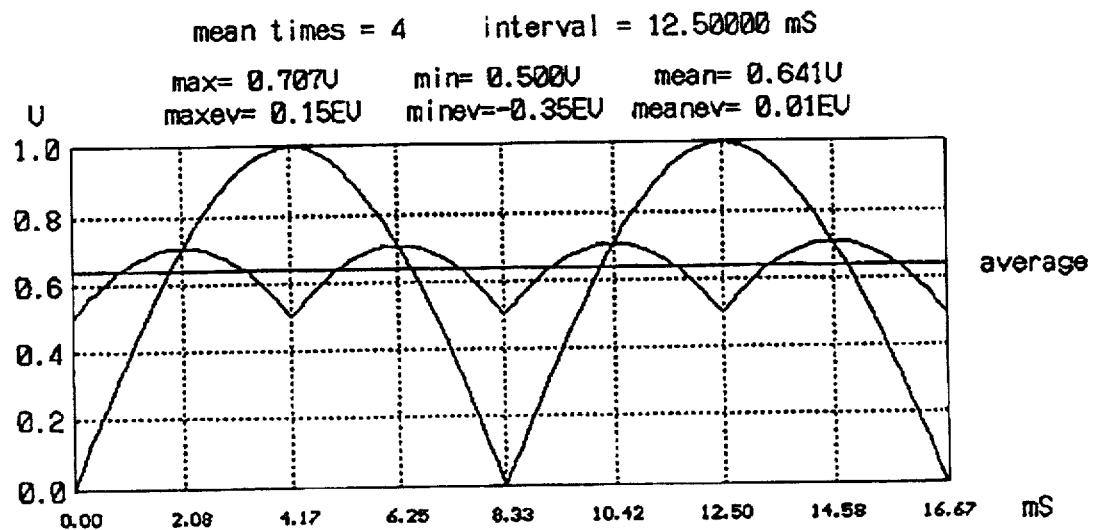

FIGS. 19A and 19B are graphs showing photometry errors obtained when four photometered values are averaged, and the photometry cycle is set to be 1.25 times the flicker cycle at 50 Hz, i.e., 12.5 ms. In this case, the maximum error is as small as 0.08 EV at 50 Hz (FIG. 19A), but the maximum error is relatively large, i.e., 0.35 EV, at 60 Hz (FIG. 19B).

Figure 20A:
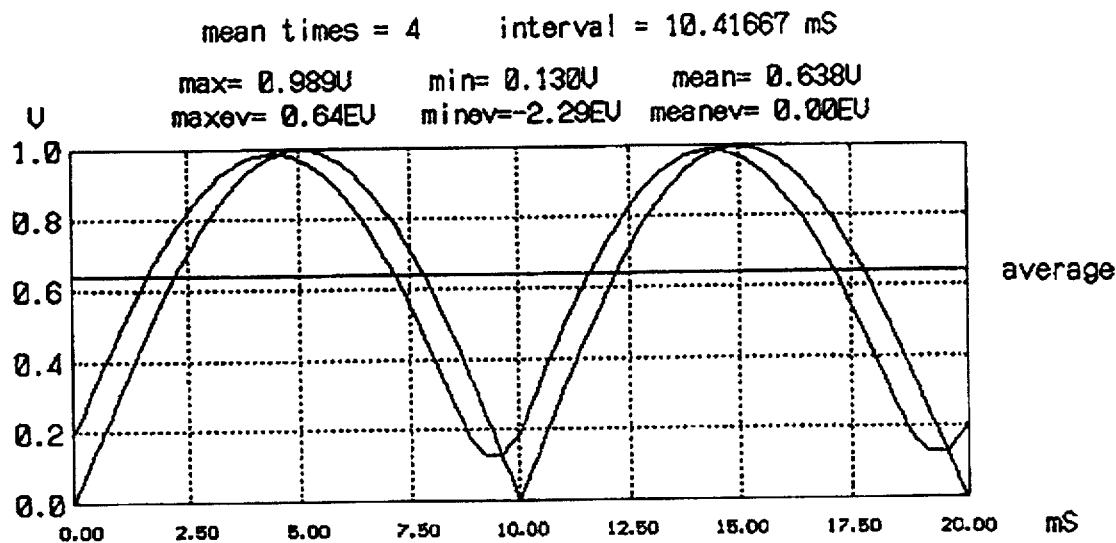
FIGS. 20A and 20B are graphs showing the simulation results of photometry errors caused by flickering.
Figure 20B:
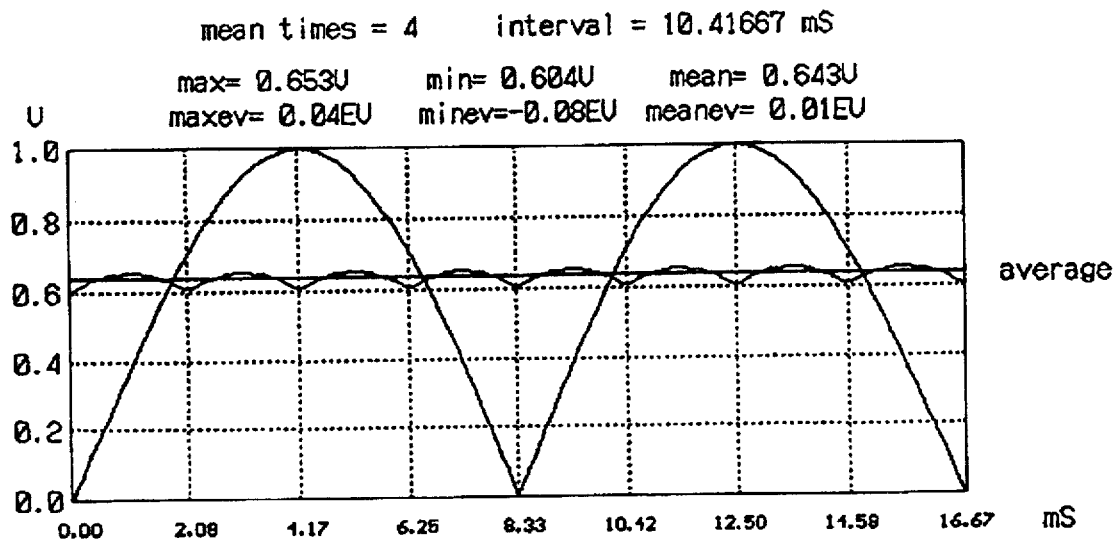

FIGS. 20A and 20B are graphs showing photometry errors obtained when four photometered values are averaged, and the photometry cycle is set to be 1.25 times the flicker cycle at 60 Hz, i.e., about 10.42 ms. In this case, the maximum error is as small as 0.08 EV at 60 Hz (FIG. 20B) but, the maximum error becomes very large, i.e., 2.29 EV, at 50 Hz (FIG. 20A).

Figure 21A:
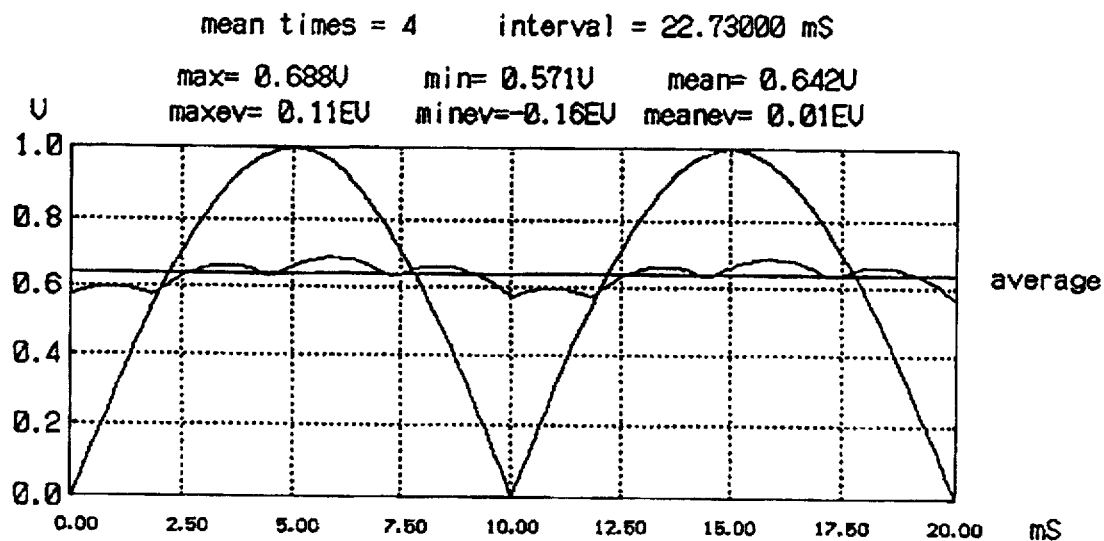
FIGS. 21A and 21B are graphs showing the simulation results of photometry errors caused by flickering.
Figure 21B:
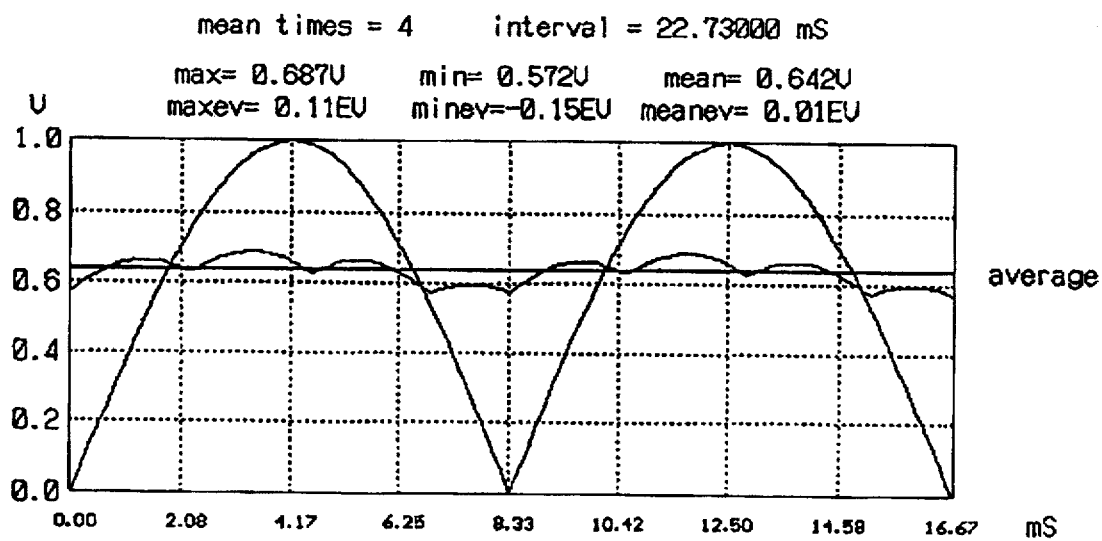

FIGS. 21A and 21B are graphs showing photometry errors obtained when four photometered values are averaged, and the photometry cycle is set to be 22.73 ms. In this case, the maximum error is 0.16 EV at 50 Hz (FIG. 21A), and the maximum error is 0.15 EV at 60 Hz (FIG. 21B), thus obtaining balanced values for both the frequencies.

With the above-mentioned results, it is expected that a photometry cycle that generates only small photometry errors for both 50 Hz and 60 Hz be present.

Figures 22A, 22B, 22C:
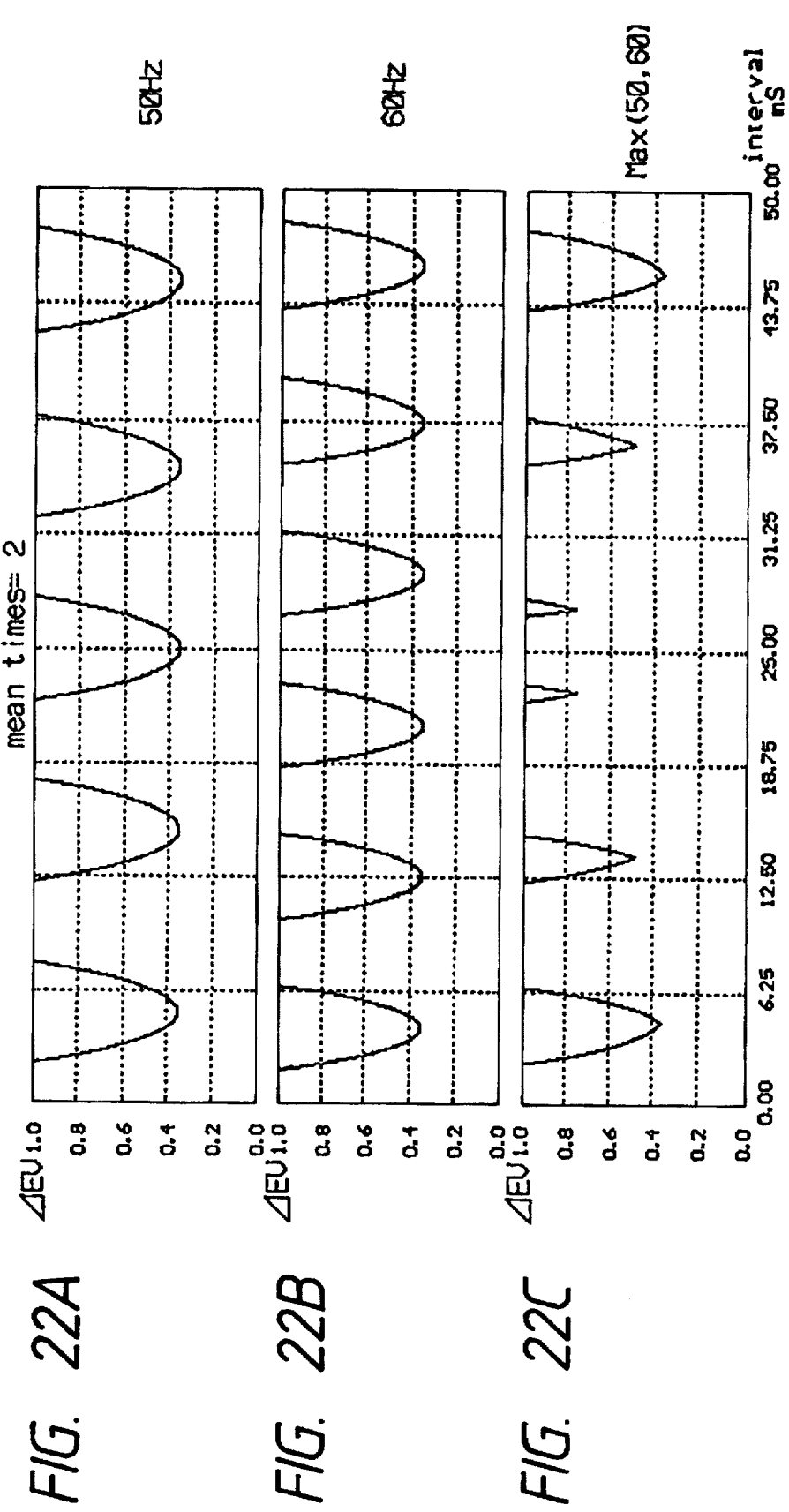
FIGS. 22A to 22C are graphs showing the simulation results of minimal points of photometry errors.

FIGS. 22A to 22C are graphs showing the simulation results of a maximum photometry error $\Delta EV$ upon averaging of two photometered values by plotting the photometry cycle along the abscissa within the range from 0 ms to 50 ms. FIG. 22A corresponds to a 50-Hz power supply, and FIG. 22B corresponds to a 60-Hz power supply. On the other hand, FIG. 22C shows larger ones of errors at 50 Hz and 60 Hz.

As can be seen from these graphs, the photometry error becomes large at the photometry cycle in the neighborhood of an integer multiple of the flicker cycle, since photometry operations are always performed at the same phase positions of flickering if the flicker cycle is close to the photometry cycle, as described above. As can be seen from FIG. 22C, there are some points where the errors become small at both 50 Hz and 60 Hz, i.e., some minimal points of the graph. In this manner, when photometry operations are performed at a photometry cycle in the neighborhood of a minimal point of the graph, a photometered value with a small error can be obtained even when the photometry operation is started in an arbitrary phase at the flicker cycle of either frequency.

In the graph in FIG. 22C, six minimal points are observed, and their values are respectively, 4.54 ms, 13.64 ms, 22.73 ms, 27.27 ms, 36.36 ms, and 45.45 ms. Of these cycles, photometry cycles with smallest errors are 4.54 ms and 45.45 ms.

Figure 23A:
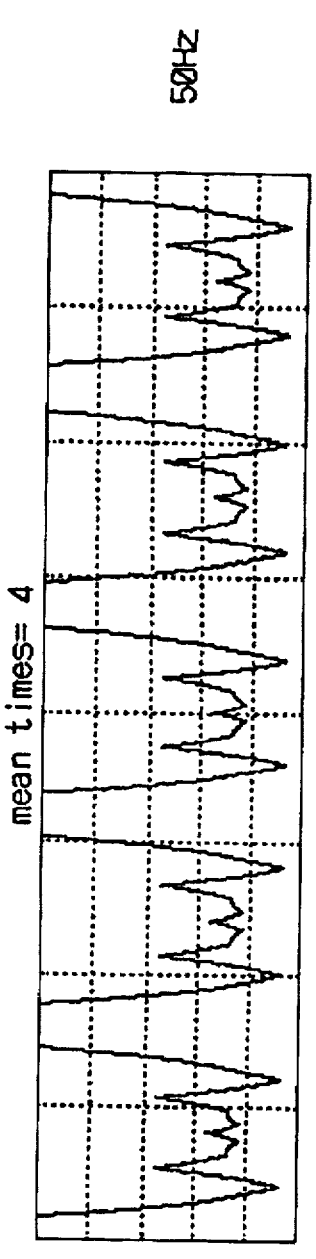
FIGS. 23A to 23C are graphs showing the simulation results of minimal points of photometry errors.
Figure 23B:
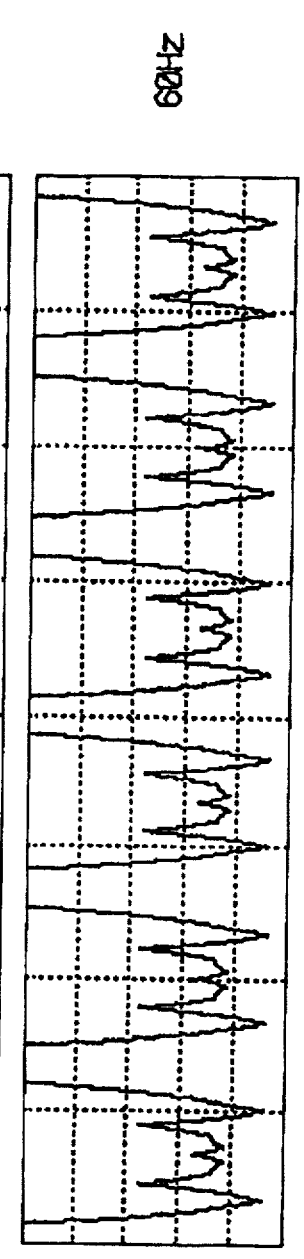
Figure 23C:
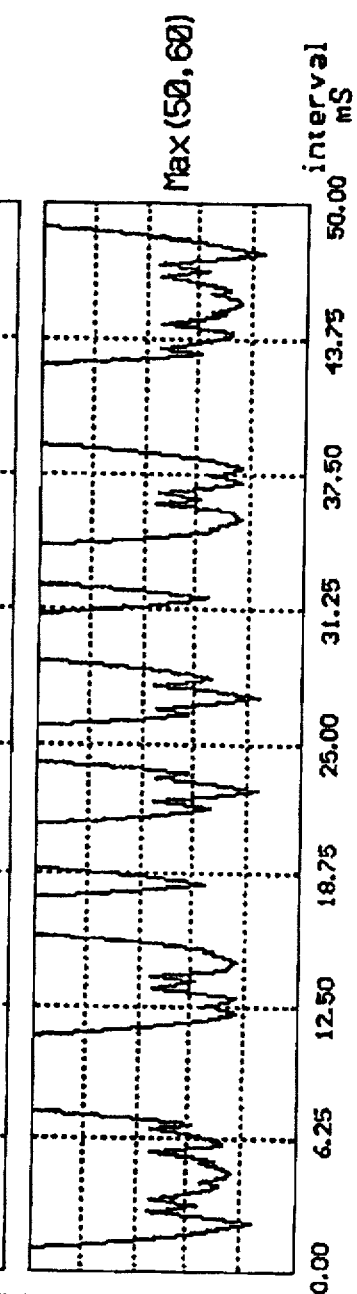

FIGS. 23A to 23C are graphs showing the relationship between the photometry cycle and the photometry error upon averaging of four photometered values. Although the graphs in this case are complex, principal minimal points in FIG. 23C are 2.27 ms, 47.73 ms, 27.27 ms, 22.73 ms, and the like.

Figures 24A, 24B, 24C:
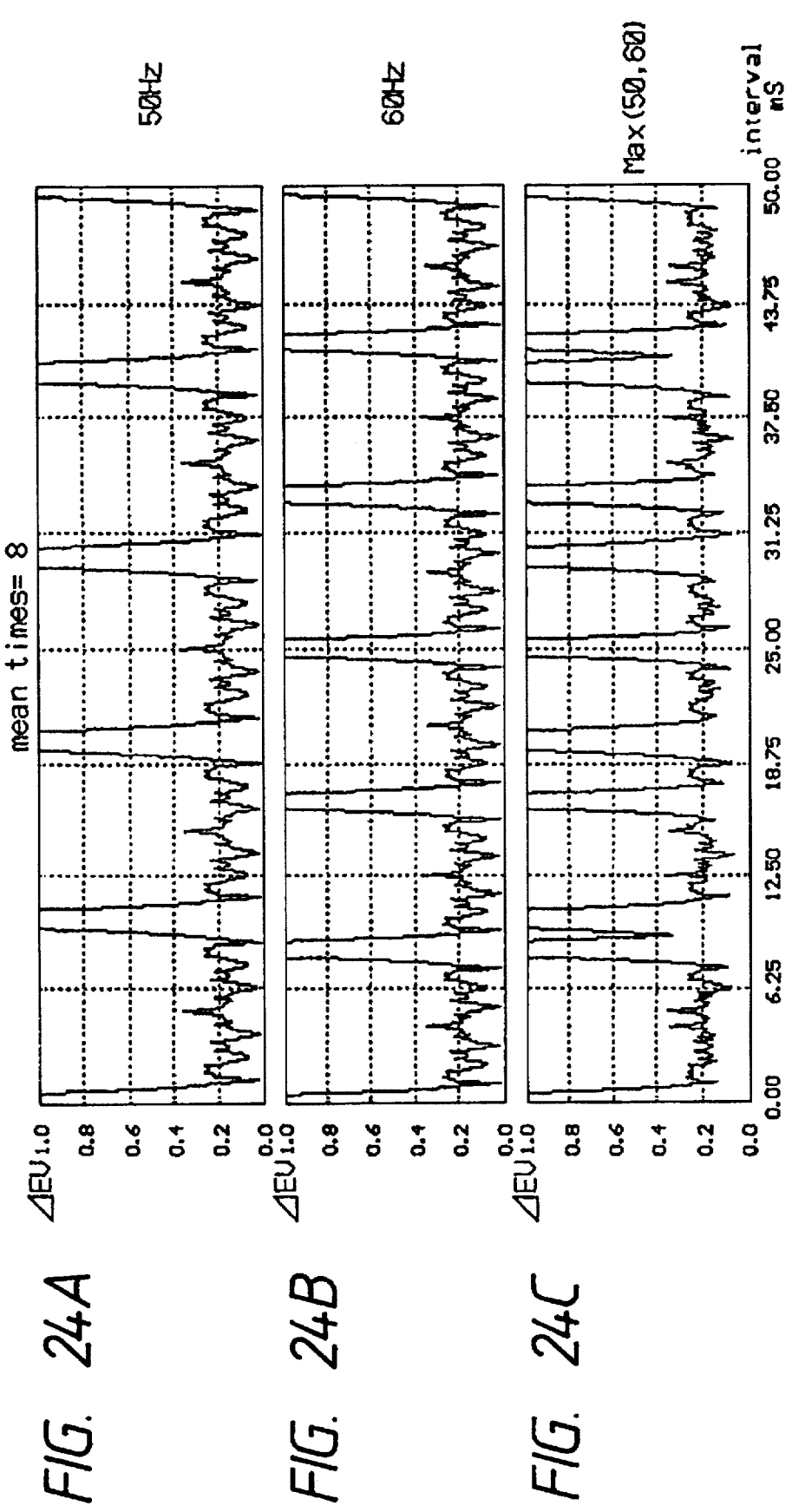
FIGS. 24A to 24C are graphs showing the simulation results of minimal points of photometry errors.

FIGS. 24A to 24C are graphs upon averaging of eight photometered values. In this case, principal minimal points are 36.36 ms, 13.64 ms, 31.26 ms, 6.26 ms, and the like.

Figure 25:
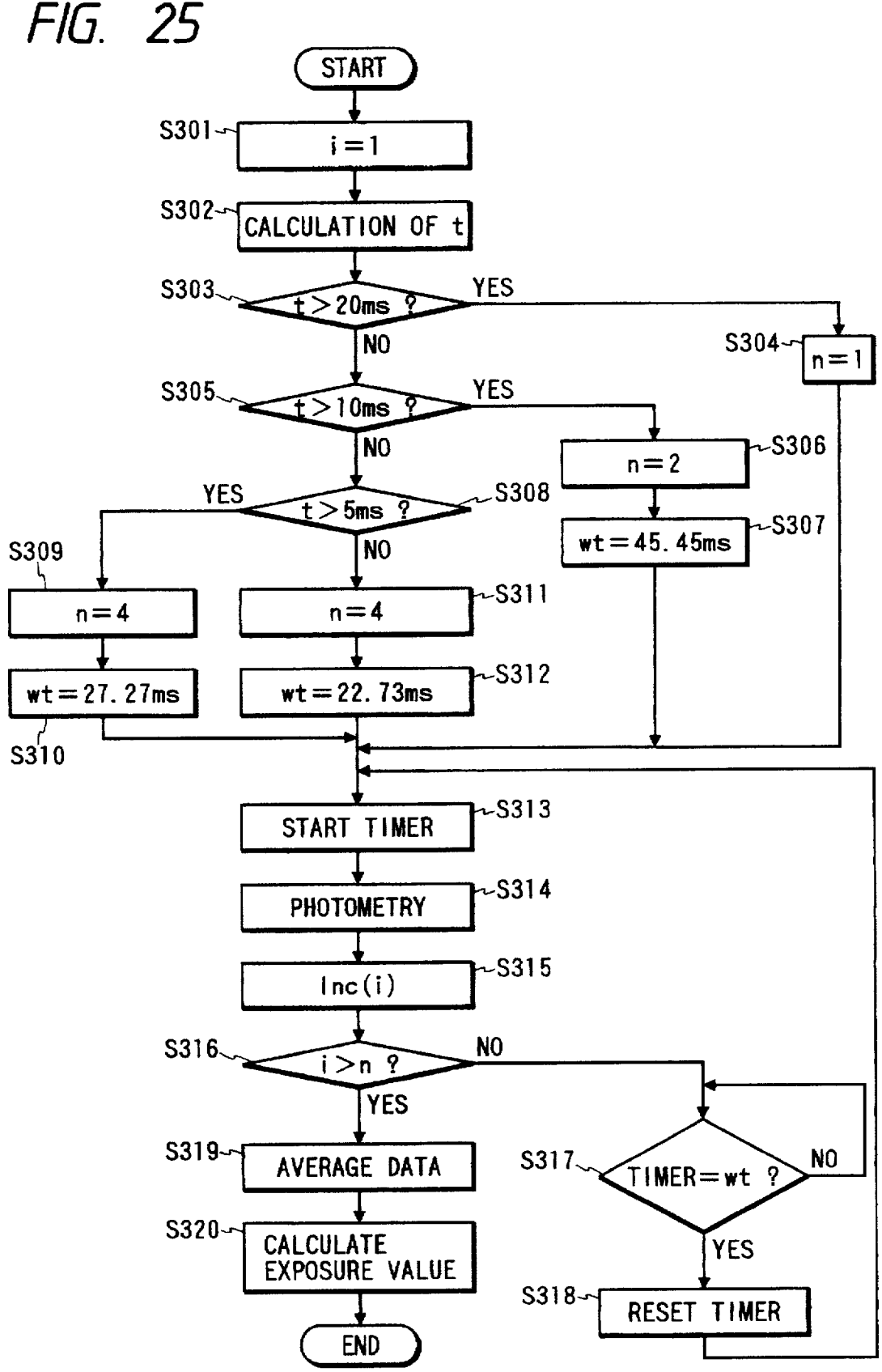
FIG. 25 is a flow chart showing the algorithm of the photometry device according to the embodiment shown in FIG. 9.

FIG. 25 is a flow chart showing the program of the microprocessor 110.

This program is executed when a release button (not shown) of the camera is depressed to its half stroke position and the power supply of the camera is turned on.

In step S301, a variable i for counting the number of times of photometry operations is initialized to "1". In step S302, the accumulation time t for a photometry operation is calculated. Since the method of calculating the accumulation time t is described in detail in, for example, Japanese Patent Application Laid-Open No. 6-95200, a detailed description thereof will be omitted.

In step S303, it is checked if the accumulation time t is longer than 20 ms. If Y in step S303, the flow advances to step S304, and the number n of photometric values to be averaged is set to be 1, i.e., a value obtained by one photometry operation is used as the photometered result without averaging. This is because an accumulation time sufficiently longer than the flicker cycle is hardly influenced by flickering, and the photometry operation can be conveniently completed within a short period of time.

If N in step S303, it is checked in step S305 if the accumulation time t is longer than 10 ms. If Y in step S305, the flow advances to step S306 to set the number n of photometric values to be averaged to be 2. In step S307, the photometry cycle, wt, is set to be 45.45 ms. When the accumulation time is longer than the flicker cycle, since it is hardly influenced by flickering, a large photometry error is not generated even with a small number of photometric values to be averaged. As described above, since the time required for reading photometry data is 14.28 ms, the photometry time including the accumulation time of 10 ms becomes 24.28 ms or longer. For this reason, the photometry cycle must be equal to or larger than 24.28 ms.

If N in step S305, it is checked in step S308 if t is longer than 5 ms. If Y in step S308, the number n of photometric values to be averaged is set to be 4 in step S309, and the photometry cycle is set to be 27.27 ms in step S310.

If N in step S308, the number n of photometric values to be averaged is set to be 4 in step S311, and the photometry cycle is set to be 22.73 ms in step S312. This time duration is selected as an optimal photometry cycle depending on the accumulation time duration which determines the photometry time.

In step S313, the counting operation of a timer for measuring the photometry cycle is started. Furthermore, in step S314, a photometry operation is performed in accordance with the calculated accumulation time t, and photometry data are read. In step S315, the variable i indicating the number of times of photometry operations is incremented by 1. In step S316, it is checked if i is larger than n.

If N in step S316, the control waits in step S317 until the count value of the timer reaches the photometry cycle wt. In step S318, the timer is reset, and the flow returns to step S313.

In step S319, the average value of photometry data is calculated, and is determined as a photometered result. In step S320, an appropriate exposure value is calculated based on the photometered result. Since the method of calculating the appropriate exposure value is also described in detail in the above-mentioned reference, a detailed description thereof will be omitted.

What is claimed is:

1. A photometry device comprising:
   a photometry unit which performs a photometry operation of an object field using an accumulation type photometry element; and
   an accumulation time determination unit which determines an accumulation time of the photometry element,
   wherein said accumulation time determination unit determines an accumulation time for a next photometry operation by calculating a weighted average of accumulation times in previously performed photometry operations.

2. A photometry device according to claim 1, further comprising:
   a discrimination unit which discriminates if a current photometry operation of said photometry unit is a first photometry operation after the photometry operation is started,
   wherein said accumulation time determination unit determines the accumulation time for the next photometry operation by calculating the weighted average of the accumulation times in the previously performed photometry operations when said discrimination unit determines that the current photometry operation of said photometry unit is not the first photometry operation after the photometry operation is started.

3. A photometry device according to claim 1, further comprising:
   a light source discrimination unit which discriminates if a light source for illuminating the object field is a light source having a flicker cycle,
   wherein said accumulation time determination unit determines the accumulation time for the next photometry operation by calculating the weighted average of the accumulation times in the previously performed photometry operations when said light source discrimination unit determines that the light source is a light source having a flicker cycle.

4. A photometry device according to claim 1, wherein said accumulation time determination unit determines the accumulation time for the next photometry operation by calculating the weighted average of values including at least an accumulation time in an immediately preceding photometry operation.

5. A photometry device according to claim 4, wherein said accumulation time determination unit determines the accumulation time for the next photometry operation by further using a photometered value in the immediately preceding photometry operation.

6. A photometry device according to claim 1, wherein said accumulation time determination unit determines the accumulation time for the next photometry operation by calculating the weighted average of a value calculated using a photometered value in an immediately preceding photometry operation, and a value of an accumulation time in the immediately preceding photometry operation.

7. A photometry device according to claim 1, wherein said accumulation time determination unit outputs a predetermined accumulation time value in the first photometry operation after the photometry operation is started.

8. A photometry device according to claim 1, wherein said accumulation time determination unit sets a duration substantially corresponding to one flicker cycle to be a value of the accumulation time in the first photometry operation after the photometry operation is started.

9. A camera comprising:
   a photometry device including a photometry unit to perform a photometry operation of an object field using an accumulation type photometry element; and
   an accumulation time determination unit to determine an accumulation time of the photometry element,
   wherein said accumulation time determination unit determines an accumulation time for a next photometry operation by calculating a weighted average of accumulation times in previously performed photometry operations; and
   an exposure controller which performs exposure control to a film on the basis of an output from said photometry device.

10. A camera comprising:
    a photometry device including
      a photometry unit to perform a photometry operation of an object field using an accumulation type photometry element; and
      an accumulation time determination unit to determine an accumulation time of the photometry element,
      wherein said accumulation time determination unit determines an accumulation time for a next photometry operation by calculating a weighted average of accumulation times in previously performed photometry operations,
    a discrimination unit to discriminate if a current photometry operation of said photometry unit is a first photometry operation after the photometry operation is started,
    wherein said accumulation time determination unit determines the accumulation time for the next photometry operation by calculating the weighted average of the accumulation times in the previously performed photometry operations when said discrimination unit determines that the current photometry operation of said photometry unit is not the first photometry operation after the photometry operation is started; and an exposure controller which performs exposure control to a film on the basis of an output from said photometry device.

11. A camera comprising:

a photometry device including a photometry unit to perform a photometry operation of an object field using an accumulation type photometry element; and an accumulation time determination unit to determine an accumulation time of the photometry element, wherein said accumulation time determination unit determines an accumulation time for a next photometry operation by calculating a weighted average of accumulation times in previously performed photometry operations, a light source discrimination unit to discriminate if a light source for illuminating the object field is a light source having a flicker cycle, wherein said accumulation time determination unit determines the accumulation time for the next photometry operation by calculating the weighted average of the accumulation times in the previously performed photometry operations when said light source discrimination unit determines that the light source is a light source having a flicker cycle; and an exposure controller which performs exposure control to a film on the basis of an output from said photometry device.

12. A camera comprising:

a photometry device including a photometry unit to perform a photometry operation of an object field using an accumulation type photometry element; and an accumulation time determination unit to determine an accumulation time of the photometry element, wherein said accumulation time determination unit determines an accumulation time for a next photometry operation by calculating a weighted average of accumulation times in previously performed photometry operations, and wherein said accumulation time determination unit determines the accumulation time for the next photometry operation by calculating the weighted average of values including at least an accumulation time in an immediately preceding photometry operation; and an exposure controller which performs exposure control to a film on the basis of an output from said photometry device.

13. A camera comprising:

a photometry device including a photometry unit to perform a photometry operation of an object field using an accumulation type photometry element; and an accumulation time determination unit to determine an accumulation time of the photometry element, wherein said accumulation time determination unit determines an accumulation time for a next photometry operation by calculating a weighted average of accumulation times in previously performed photometry operations, wherein said accumulation time determination unit determines the accumulation time for the next photometry operation by calculating the weighted average of values including at least an accumulation time in an immediately preceding photometry operation, and wherein said accumulation time determination unit determines the accumulation time for the next photometry operation by further using a photometered value in the immediately preceding photometry operation; and an exposure controller which performs exposure control to a film on the basis of an output from said photometry device.

14. A camera comprising:

a photometry device including a photometry unit to perform a photometry operation of an object field using an accumulation type photometry element; and an accumulation time determination unit to determine an accumulation time of the photometry element, wherein said accumulation time determination unit determines an accumulation time for a next photometry operation by calculating a weighted average of accumulation times in previously performed photometry operations, wherein said accumulation time determination unit determines the accumulation time for the next photometry operation by calculating the weighted average of a value calculated using a photometered value in an immediately preceding photometry operation, and a value of an accumulation time in the immediately preceding photometry operation; and an exposure controller which performs exposure control to a film on the basis of an output from said photometry device.

15. A camera comprising:

a photometry device including photometry unit to perform a photometry operation of an object field using an accumulation type photometry element; and an accumulation time determination unit to determine an accumulation time of the photometry element, wherein said accumulation time determination unit determines an accumulation time for a next photometry operation by calculating a weighted average of accumulation times in previously performed photometry operations, and wherein said accumulation time determination unit outputs a predetermined accumulation time value in the first photometry operation after the photometry operation is started; and an exposure controller which performs exposure control to a film on the basis of an output from said photometry device.

16. A camera comprising:

a photometry device including photometry unit to perform a photometry operation of an object field using an accumulation type photometry element; and an accumulation time determination unit to determine an accumulation time of the photometry element, wherein said accumulation time determination unit determines an accumulation time for a next photometry operation by calculating a weighted average of accumulation times in previously performed photometry operations, and wherein said accumulation time determination unit sets a duration substantially corresponding to one flicker cycle to be a value of the accumulation time in the first photometry operation after the photometry operation is started; and an exposure controller which performs exposure control to a film on the basis of an output from said photometry device.

17. A photometry device comprising:

a photometry circuit which performs a photometry operation of an object field using a photometry element; and a calculation circuit which obtains a photometric output by averaging a plurality of photometric values output at different times from said photometry circuit, wherein said calculation circuit averages a predetermined number of photometric values obtained at a cycle with which a larger one of the following two maximum values assumes a minimal value, one of said two maximum values being a maximum value of a photometric value error from a root-mean-square value upon photometry of a light source having a first flicker cycle with the photometry being started at an arbitrary phase point within the first flicker cycle, and the other of said two maximum values being a maximum value of a photometric value error from a root-mean-square value upon photometry of a light source having a second flicker cycle with the photometry being started at an arbitrary phase point within the second flicker cycle.

18. A photometry device according to claim 17, wherein the photometry element comprises an accumulation type photometry element.

19. A photometery device according to claim 18, wherein said calculation circuit averages the predetermined number of photometric values obtained at the cycle when an accumulation time of the photometry element is smaller than a predetermined value.

20. A photometry device according to claim 17, wherein said calculation circuit selects the cycle from a plurality of cycles.

21. A photometry device according to claim 18, wherein said calculation circuit switches the cycle in correspondence with a duration of the accumulation time of the photometry element.

22. A photometery device according to claim 18, wherein said calculation circuit switches the predetermined number of photometric values to be averaged in correspondence with a duration of the accumulation time of the photometry element.

23. A photometery device according to claim 17, wherein the predetermined number of photometric values is 4, the first flicker cycle is about 10 ms, the second flicker cycle is about 8.33 ms, and the cycle is about 2.27 ms.

24. A photometery device according to claim 17, wherein the predetermined number of photometric values is 4, the first flicker cycle is about 10 ms, the second flicker cycle is about 8.33 ms, and the cycle is about 47.73 ms.

25. A photometery device according to claim 17, wherein the predetermined number of photometric values is 4, the first flicker cycle is about 10 ms, the second flicker cycle is about 8.33 ms, and the cycle is about 27.27 ms.

26. A photometery device according to claim 17, wherein the predetermined number of photometric values is 4, the first flicker cycle is about 10 ms, the second flicker cycle is about 8.33 ms, and the cycle is about 22.73 ms.

27. A camera comprising:

a photometry device including a photometry circuit to perform a photometry operation of an object field using a photometry element; and a calculation circuit to obtain a photometric output by averaging a plurality of photometric values output at different times from said photometry circuit, wherein said calculation circuit averages a predetermined number of photometric values obtained at a cycle with which a larger one of the following two maximum values assumes a minimal value, one of said two maximum values being a maximum value of a photometric value error from a root-mean-square value upon photometry of a light source having a first flicker cycle with the photometry being started at an arbitrary phase point within the first flicker cycle, and the other of said two maximum values being a maximum value of a photometric value error from a root-mean-square value upon photometry of a light source having a second flicker cycle with the photometry being started at an arbitrary phase point within the second flicker cycle; and an exposure controller which performs exposure control to a film on the basis of an output from said photometry device.

28. A camera comprising:

a photometry device including a photometry circuit to perform a photometry operation of an object field using a photometry element; and a calculation circuit to obtain a photometric output by averaging a plurality of photometric values output at different times from said photometry circuit, wherein said calculation circuit averages a predetermined number of photometric values obtained at a cycle with which a larger one of the following two maximum values assumes a minimal value, one of said two maximum values being a maximum value of a photometric value error from a root-mean-square value upon photometry of a light source having a first flicker cycle with the photometry being started at an arbitrary phase point within the first flicker cycle, and the other of said two maximum values being a maximum value of a photometric value error from a root-mean-square value upon photometry of a light source having a second flicker cycle with the photometry being started at an arbitrary phase point within the second flicker cycle, wherein photometry element comprises an accumulation type photometry element; and an exposure controller which performs exposure control to a film on the basis of an output from said photometry device.

29. A camera comprising:

a photometry device including a photometry circuit to perform a photometry operation of an object field using a photometry element; and a calculation circuit to obtain a photometric output by averaging a plurality of photometric values output at different times from said photometry circuit, wherein said calculation circuit averages a predetermined number of photometric values obtained at a cycle with which a larger one of the following two maximum values assumes a minimal value, one of said two maximum values being a maximum value of a photometric value error from a root-mean-square value upon photometry of a light source having a first flicker cycle with the photometry being started at an arbitrary phase point within the first flicker cycle, and the other of said two maximum values being a maximum value of a photometric value error from a root-mean-square value upon photometry of a light source having a second flicker cycle with the photometry being started at an arbitrary phase point within the second flicker cycle, wherein the photometry element comprises an accumulation type photometry element, and wherein said calculation circuit averages the predetermined number of photometric values obtained at the cycle when an accumulation time of the photometry element is smaller than a predetermined value; and an exposure controller which performs exposure control to a film on the basis of an output from said photometry device.

30. A camera comprising:

a photometry device including a photometry circuit to perform a photometry operation of an object field using a photometry element; and a calculation circuit to obtain a photometric output by averaging a plurality of photometric values output at different times from said photometry circuit, wherein said calculation circuit averages a predetermined number of photometric values obtained at a cycle with which a larger one of the following two maximum values assumes a minimal value, one of said two maximum values being a maximum value of a photometric value error from a root-mean-square value upon photometry of a light source having a first flicker cycle with the photometry being started at an arbitrary phase point within the first flicker cycle, and the other of said two maximum values being a maximum value of a photometric value error from a root-mean-square value upon photometry of a light source having a second flicker cycle with the photometry being started at an arbitrary phase point within the second flicker cycle, wherein said calculation circuit selects the cycle from a plurality of cycles; and an exposure controller which performs exposure control to a film on the basis of an output from said photometry device.

31. A camera comprising:

a photometry device including a photometry circuit to perform a photometry operation of an object field using a photometry element; and a calculation circuit to obtain a photometric output by averaging a plurality of photometric values output at different times from said photometry circuit, wherein said calculation circuit averages a predetermined number of photometric values obtained at a cycle with which a larger one of the following two maximum values assumes a minimal value, one of said two maximum values being a maximum value of a photometric value error from a root-mean-square value upon photometry of a light source having a first flicker cycle with the photometry being started at an arbitrary phase point within the first flicker cycle, and the other of said two maximum values being a maximum value of a photometric value error from a root-mean-square value upon photometry of a light source having a second flicker cycle with the photometry being started at an arbitrary phase point within the second flicker cycle, wherein the photometry element comprises an accumulation type photometry element, wherein said calculation circuit switches the cycle in correspondence with a duration of the accumulation time of the photometry element; and an exposure controller which performs exposure control to a film on the basis of an output from said photometry device.

32. A camera comprising:

a photometry device including a photometry circuit to perform a photometry operation of an object field using a photometry element; and a calculation circuit to obtain a photometric output by averaging a plurality of photometric values output at different times from said photometry circuit, wherein said calculation circuit averages a predetermined number of photometric values obtained at a cycle with which a larger one of the following two maximum values assumes a minimal value, one of said two maximum values being a maximum value of a photometric value error from a root-mean-square value upon photometry of a light source having a first flicker cycle with the photometry being started at an arbitrary phase point within the first flicker cycle, and the other of said two maximum values being a maximum value of a photometric value error from a root-mean-square value upon photometry of a light source having a second flicker cycle with the photometry being started at an arbitrary phase point within the second flicker cycle, wherein the photometry element comprises an accumulation type photometry element, wherein said calculation circuit switches the predetermined number of photometric values to be averaged in correspondence with a duration of the accumulation time of the photometry element; and an exposure controller which performs exposure control to a film on the basis of an output from said photometry device.

* * * * *